(12) United States Patent
Sakuma et al.

(10) Patent No.: US 12,259,339 B2
(45) Date of Patent: Mar. 25, 2025

(54) LIGHT-SOURCE APPARATUS, INSPECTION APPARATUS, AND ADJUSTMENT METHOD

(71) Applicant: Lasertec Corporation, Kanagawa (JP)

(72) Inventors: Jun Sakuma, Yokohama (JP); Ryotaro Mori, Yokohama (JP)

(73) Assignee: LASERTEC CORPORATION, Yokohama (JP)

(*) Notice: Subject to any disclaimer, the term of this patent is extended or adjusted under 35 U.S.C. 154(b) by 300 days.

(21) Appl. No.: 18/154,679

(22) Filed: Jan. 13, 2023

(65) Prior Publication Data

US 2023/0417684 A1 Dec. 28, 2023

(30) Foreign Application Priority Data

Jun. 28, 2022 (JP) .................................. 2022-103448

(51) Int. Cl.
*G01N 21/956* (2006.01)

(52) U.S. Cl.
CPC ... *G01N 21/956* (2013.01); *G01N 2201/0636* (2013.01)

(58) Field of Classification Search
None
See application file for complete search history.

(56) References Cited

U.S. PATENT DOCUMENTS

| 5,093,832 | A | * | 3/1992 | Bethune | ................ G02F 1/37 |
| | | | | | 359/328 |
| 6,614,584 | B1 | * | 9/2003 | Govorkov | ............ G02F 1/3544 |
| | | | | | 359/328 |
| 7,177,340 | B2 | * | 2/2007 | Lang | .................... H01S 5/141 |
| | | | | | 372/102 |
| 7,443,892 | B2 | * | 10/2008 | Ma | ...................... G02F 1/3544 |
| | | | | | 372/21 |

(Continued)

FOREIGN PATENT DOCUMENTS

| JP | H0511300 A | 1/1993 |
| JP | H10268367 A | 10/1998 |

(Continued)

OTHER PUBLICATIONS

Japanese Patent Office, Office Action Issued in Application No. 2022-103448, Jul. 12, 2021, 12 pages. (Submitted with Machine Translation).

*Primary Examiner* — Marcus H Taningco
*Assistant Examiner* — Djura Malevic
(74) *Attorney, Agent, or Firm* — McCoy Russell LLP

(57) ABSTRACT

A light-source apparatus, an inspection apparatus, and an adjustment method capable of facilitating the adjustment of the temperature of a BBO crystal are provided. A light-source apparatus according to the present disclosure includes a first light source configured to generate visible light, a first external resonator including a plurality of optical mirrors, a BBO crystal disposed in the first external resonator, capable of generating UV light in a wavelength range (Continued)

of 233 nm to 236 nm, the UV light being a second harmonic of the visible light, a one- or two-dimensional semiconductor sensor disposed near a far-field image plane formed through an optical element provided on an optical path of the UV light, and a calculation unit configured to calculate a representative position of a light intensity distribution detected by the semiconductor sensor.

5 Claims, 18 Drawing Sheets

(56) References Cited

U.S. PATENT DOCUMENTS

| | | | | |
|---|---|---|---|---|
| 8,038,305 | B2* | 10/2011 | Egawa | G02F 1/37 |
| | | | | 359/223.1 |
| 9,509,112 | B2* | 11/2016 | Chuang | G02F 1/3534 |
| 10,044,166 | B2* | 8/2018 | Chuang | G02F 1/353 |
| 10,175,555 | B2* | 1/2019 | Chuang | G02F 1/3501 |
| 10,429,719 | B2* | 10/2019 | Chuang | G02F 1/3558 |
| 11,624,810 | B2* | 4/2023 | Luff | G01S 17/42 |
| | | | | 356/4.01 |
| 11,762,261 | B2* | 9/2023 | Wang | G02F 1/353 |
| | | | | 359/330 |
| 12,019,185 | B2* | 6/2024 | Boloorian | G01S 17/34 |
| 2005/0105082 | A1* | 5/2005 | Wada | G01N 21/636 |
| | | | | 356/239.2 |
| 2006/0039423 | A1* | 2/2006 | Tokuhisa | G02F 1/353 |
| | | | | 372/22 |
| 2008/0037599 | A1* | 2/2008 | Ma | H01S 5/0092 |
| | | | | 372/21 |
| 2008/0212085 | A1* | 9/2008 | Wada | G01N 21/636 |
| | | | | 356/239.2 |
| 2010/0128343 | A1* | 5/2010 | Imai | G02F 1/3532 |
| | | | | 359/326 |
| 2012/0026578 | A1* | 2/2012 | Sakuma | G02F 1/37 |
| | | | | 359/328 |
| 2013/0250979 | A1* | 9/2013 | Muendel | H01S 5/06821 |
| | | | | 372/20 |
| 2020/0018857 | A1* | 1/2020 | Feng | G01S 7/4917 |
| 2023/0417684 | A1* | 12/2023 | Sakuma | H01S 3/0092 |

FOREIGN PATENT DOCUMENTS

| | | |
|---|---|---|
| JP | 2000250082 A | 9/2000 |
| JP | 2003057696 A | 2/2003 |
| JP | 2004022946 A | 1/2004 |
| JP | 2004055695 A | 2/2004 |
| JP | 2006317724 A | 11/2006 |
| JP | 2006343786 A | 12/2006 |
| JP | 4572074 B2 | 10/2010 |
| JP | 4729094 B2 | 7/2011 |
| JP | 2014149315 A | 8/2014 |
| JP | 5825642 B2 | 12/2015 |
| JP | 6210520 B1 | 10/2017 |

* cited by examiner

LIGHT-SOURCE APPARATUS, INSPECTION APPARATUS, AND ADJUSTMENT METHOD

INCORPORATION BY REFERENCE

This application is based upon and claims the benefit of priority from Japanese patent application No. 2022-103448, filed on Jun. 28, 2022, the disclosure of which is incorporated herein in its entirety by reference.

BACKGROUND

The present disclosure relates to a light-source apparatus, an inspection apparatus, and an adjustment method.

In an inspection apparatus for inspecting photomasks for defects, an irradiation light source that emits light having a short wavelength, in particular, light in a deep UV (Ultra-Violet) range of 250 nm or shorter, is used in order to improve optical resolution. In this case, a high-power light source capable of continuously outputting such light is desired in order to enable an inspection to be performed continuously at a high speed.

To generate continuous light in a deep UV range, the second harmonic or the sum frequency of laser light(s) in a visible or IR (InfraRed) range is generated by an external resonator equipped with a nonlinear optical crystal therein (see Japanese Unexamined Patent Application Publication No. 2004-055695).

$CsLiB_6O_{10}$ (CLBO), $\beta\text{-}BaB_2O_4$ (BBO) and $LiB_3O_5$ (LBO) crystals are typically used as nonlinear optical crystals for generating UV light.

An apparatus that generates a second harmonic can be formed of one excitation light source, so it is generally simpler and more efficient than an apparatus that generates a sum frequency and hence requires two light sources. However, the limit of a wavelength that can be generated as a second harmonic is 205 nm at which phase matching can be obtained by a BBO crystal, so light having a wavelength shorter than this wavelength needs to be generated as a sum frequency. BBO, LBO and CLBO crystals can all be used as a nonlinear optical crystal for generating a sum-frequency.

In Japanese Patent No. 5825642, continuously-output UV light having a wavelength of 233 nm to 234 nm is generated as a second harmonic by using a BBO crystal disposed in a first external resonator. Then, the UV light and light having a wavelength of 1,111 nm to 1,130 nm are sum-frequency-mixed by a CLBO crystal disposed in a second external resonator, and deep UV light having a wavelength of 193.2 nm to 193.6 nm is thereby generated.

In either the generation of the second harmonic or the generation of the sum frequency, it is necessary to satisfy a phase matching condition(s) in order to generate practical UV light. The phase matching condition(s) is a special condition(s) for the refractive indexes of the crystal at the wavelengths of incident and generated light waves.

For example, a simplified phase matching condition for generating a sum frequency is expressed as $n_3/\lambda_3 = n_1/\lambda_1 + n_2/\lambda_2$. In the expression, $\lambda_1$ and $\lambda_2$ represent the wavelengths of incident lights and $\lambda_3$ represents the wavelength of the sum frequency. Further, $n_1$ and $n_2$ represent the refractive indexes for the incident lights, and $n_3$ represents the refractive index for the sum frequency. The phase matching condition for generating a second harmonic wave is obtained by setting variables in the above-described expression as $\lambda_1 = \lambda_2$ and $n_1 = n_2$.

In the case of birefringent crystals such as BBO, LBO and CLBO crystals, there are two methods for satisfying the phase matching condition, i.e., angular phase matching and temperature phase matching. The angular phase matching is a method in which an angle between an incident optical axis and a crystal axis is adjusted, while the temperature phase matching is a method in which the temperature of a crystal is adjusted by using a Peltier element or the like.

Even in the case where a nonlinear optical crystal that is processed into an angle for enabling angular phase matching is used, the temperature of the crystal (hereinafter also referred to as the crystal temperature) has to be precisely controlled in order to maintain the phase matching. This is, it is necessary to precisely control the crystal temperature in either of the angular phase matching and the temperature phase matching. When the crystal temperature is controlled, the crystal temperature is often stabilized in a range of +/−0.1° C. around the temperature at which the output of the wavelength-converted light is maximized.

When high-power UV light is generated from a nonlinear optical crystal, there is a problem that a temperature change occurs due to the absorption of UV light by the crystal itself, i.e., due to the so-called self-heating, so that the phase matching condition becomes unsatisfied in the middle of the process. Therefore, even when the crystal temperature is stabilized in a range of +/−0.1° C. around the aforementioned temperature or stabilized more accurately, the output of the UV light often becomes unstable.

UV light has high photon energy, so if UV light is continuously generated for a long time by using a nonlinear optical crystal, optical damage is caused in the crystal itself and hence the wavelength conversion efficiency deteriorates. To solve this problem, technologies in which the point of the nonlinear optical crystal at which the laser beam passes therethrough is changed have been proposed (see Japanese Unexamined Patent Application Publication No. 2003-57696, Japanese Unexamined Patent Application Publication No. 2004-22946, Japanese Unexamined Patent Application Publication No. H10-268367, Japanese Patent No. 4729093, Japanese Unexamined Patent Application Publication No. 2006-317724, and Japanese Patent No. 4572074).

However, the thermal conductivity of a nonlinear optical crystal is not high, so when the temperature of the crystal is controlled from the outside of the crystal (e.g., from the outer surface of the crystal) by using a Peltier element or the like, it is not easy to keep the temperature of the whole crystal uniform. Therefore, in general, when a crystal is spatially translated (i.e., is moved in a straight line), in some cases, the phase matching condition become unsatisfied in the middle of the process, and therefore the output of the wavelength-converted light may decrease instead of increasing.

SUMMARY

Due to self-heating and/or a crystal migration (i.e., a movement of a crystal) after optical damage, the retention temperature of the crystal at which the output of UV light is maximized, i.e., at which the phase matching condition is satisfied continuously changes. There is a problem that unless the operator or the like keeps track of this continuous change of the temperature and performs control accordingly, the UV light source cannot be operated for a long period of time.

It is obvious that, in the case of an apparatus that generates UV light or deep UV light by using two or more nonlinear optical crystals, in particular, such control is more complicated and difficult.

As means for solving the above-described problem, Japanese Unexamined Patent Application Publication No. 2014-149315 mentions that in a light-source apparatus that generates UV light by a wavelength conversion using a plurality of nonlinear optical crystals, temperatures of a plurality of nonlinear optical crystals are alternately adjusted so that the output of the final wavelength-converted light is maximized.

Further, Japanese Patent No. 6210520 mentions that wavelength-converted light is applied to a light-guiding element that generates uniform light, and feedback control for the temperature of a nonlinear optical crystal is performed so as to increase the coupling efficiency between the light-guiding element and the wavelength-converted light.

However, when UV light is generated by using a BBO crystal, it was difficult to maximize the output of the final wavelength-converted light even when the technology disclosed in Japanese Unexamined Patent Application Publication No. 2014-149315 or Japanese Patent No. 6210520 is used. Further, when one BBO crystal (i.e., one piece of BBO crystal) is used, it was also difficult to continue maximizing the output of UV light generated from the BBO crystal.

The present disclosure has been made to solve above-described problems and provides a light-source apparatus, an inspection apparatus, and an adjustment method capable of facilitating the adjustment of the temperature of a BBO crystal.

A light-source apparatus according an aspect of the present disclosure includes:
- a first light source configured to generate visible light; a first external resonator including a plurality of optical mirrors;
- a BBO crystal disposed in the first external resonator, capable of generating UV light in a wavelength range of 233 nm to 236 nm, the UV light being a second harmonic of the visible light;
- a one- or two-dimensional semiconductor sensor disposed near a far-field image plane formed through an optical element provided on an optical path of the UV light; and
- a calculation unit configured to calculate a representative position of a light intensity distribution detected by the semiconductor sensor.

Further, an inspection apparatus according to another aspect of the present disclosure uses UV light or deep UV light generated by the above-described light-source apparatus as irradiation light.

Further, an adjustment method according to another aspect of the present disclosure is a method for adjusting a temperature of a BBO crystal disposed in a first external resonator including a plurality of optical mirrors, the BBO crystal being capable of generating UV light in a wavelength range of 233 nm to 236 nm, the UV light being a second harmonic of visible light in a wavelength range of 466 nm to 472 nm,
- the adjustment method including calculating a representative position of a light intensity distribution detected by a one- or two-dimensional semiconductor sensor disposed near a far-field image plane formed through an optical element provided on an optical path of the UV light.

According to the present disclosure, it is possible to provide a light-source apparatus, an inspection apparatus, and an adjustment method capable of facilitating the adjustment of the temperature of a BBO crystal.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific configurations of embodiments will be described hereinafter with reference to the drawings. The following descriptions are given to show preferred embodiments according to the present disclosure, and the scope of the disclosure is not limited to the below-shown embodiments. In the following descriptions, components/structures to which the same symbols are assigned are components/structures substantially the same as each other.

Background Leading to Embodiment

Firstly, a process through which the inventors of the present application have conceived the present disclosure will be described. The inventors of the present application have studied a light-source apparatus that generates UV light having a wavelength of 233 nm to 236 nm from a light source that emits light having a wavelength of 466 nm to 472 nm by using a BBO crystal. As a result of the study, it has been found that the uniformity of the BBO crystal is poorer than those of CLBO and LBO crystals. Further, the inventors of the present application have found that when the BBO crystal is spatially translated (i.e., is moved in a straight line) as optical damage occurs, the amount of light absorbed by the BBO crystal changes in a discontinuous manner, and the retention temperature of the crystal for obtaining (i.e., satisfying) the optimum phase matching condition could suddenly change by 5° C. or larger.

Further, the inventors of the present application have found that in the case where deep UV light having a wavelength of about 193 nm, which is the sum-frequency-mixed light of UV light having a wavelength from 233 nm to 236 nm generated in the BBO crystal and IR (InfraRed) light having a wavelength from 1,071 to 1,138 nm, is generated, the deviation of the phase matching condition of the BBO crystal causes a more serious problem.

Figure 1:
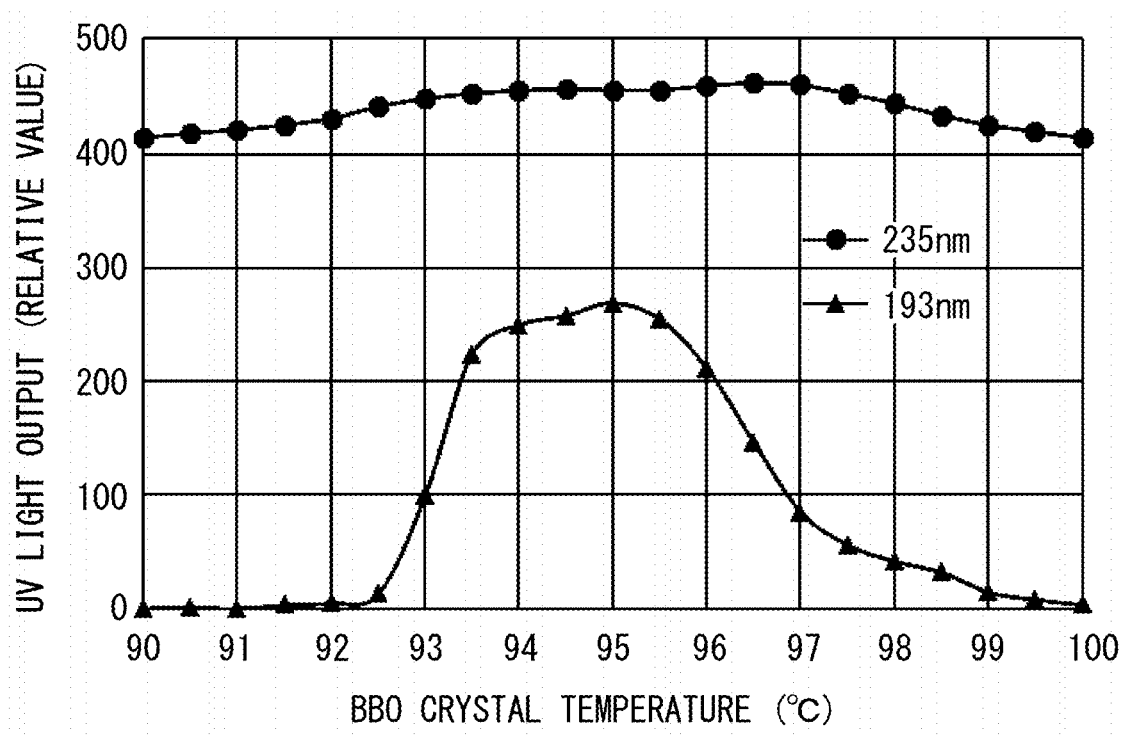
FIG. 1 is a graph showing a relationship between outputs of UV light and deep UV light and temperatures of a BBO crystal.

In FIG. 1, the horizontal axis represents the temperature (° C.) of the BBO crystal, and the vertical axis represents the relative value of the output of UV light having a wavelength of 235 nm and that of deep UV light having a wavelength of 193 nm.

Even when the temperature is changed from 90° C. to 100° C., the effect of the deviation of the phase matching condition on the output of the UV light having the wavelength of 235 nm is not large. Even at a temperature of 90° C. or 100° C., an output that is larger than 90% of the maximum output at a temperature of 95° C. can be obtained.

On the other hand, the output of the deep UV light having the wavelength of 193 nm when the temperature is 92° C. or lower, or about 100° C. is close to 0% of the maximum output at the temperature of 95° C. Therefore, if the BBO crystal is spatially translated (i.e., is moved in a straight line) and the optimum temperature deviates by 5° C. or larger, the output of deep UV light having the wavelength of 193 nm significantly decreases.

When the output of the deep UV light having the wavelength of 193 nm becomes close to zero, it is difficult to maximize the output of the deep UV light again. This is because, in addition to the fact that the amount of correction of the temperature (hereinafter also referred to as the temperature correction amount) of the BBO crystal is unknown, it is also unknown whether the retention temperature should be adjusted to the high temperature side or to the low temperature side. In this case, even if there is an apparatus that automatically finds the optimum temperature of the BBO crystal by scanning the temperature thereof, it takes a long time to restore the light source.

Next, the cause by which the output of the deep UV light having the wavelength of 193 nm generated in the CLBO crystal sharply changes with respect to the change of the temperature of the BBO crystal will be described.

The phase matching condition for generating the second harmonic in the BBO crystal corresponds to the fact that, in the BBO crystal, which is a negative uniaxial crystal, the refractive index of the fundamental wave, which propagates as an ordinary-ray, and the refractive index of the second harmonic wave, which propagates as an extraordinary-ray, are equal to each other.

The refractive index is expressed as a function of the angle between the crystal axis and the propagation direction of the light and the crystal temperature. Since the BBO crystal has a larger birefringent property than those of the other crystals, the phase matching condition becomes unsatisfied when the above-described angle is changed even slightly. That is, the BBO crystal has such a characteristic that its phase matching angle tolerance is small.

In the case of a BBO crystal having a length of 10 mm, which generates wavelength-converted light having a wavelength of 235 nm by using a fundamental wavelength of 470 nm, the phase-matching angle tolerance is only 0.18 mrad as expressed in FWHM (Full Width at Half Maximum).

Meanwhile, in order to obtain the second harmonic having a practical output, it is necessary to concentrate visible light having a small diameter in the BBO crystal by using a lens or the like. For example, when visible light is concentrated at a diameter of 100 µm, its angle of divergence (hereinafter also referred to as a divergence angle) is about 7.4 mrad in the crystal. In this divergence angle of 7.4 mrad, phase matching can be obtained only in a range of +/−0.09 mrad centered at the phase matching angle. The divergence angle of the generated second harmonic is confined within the angle range in which the phase matching is obtained.

Figure 2:
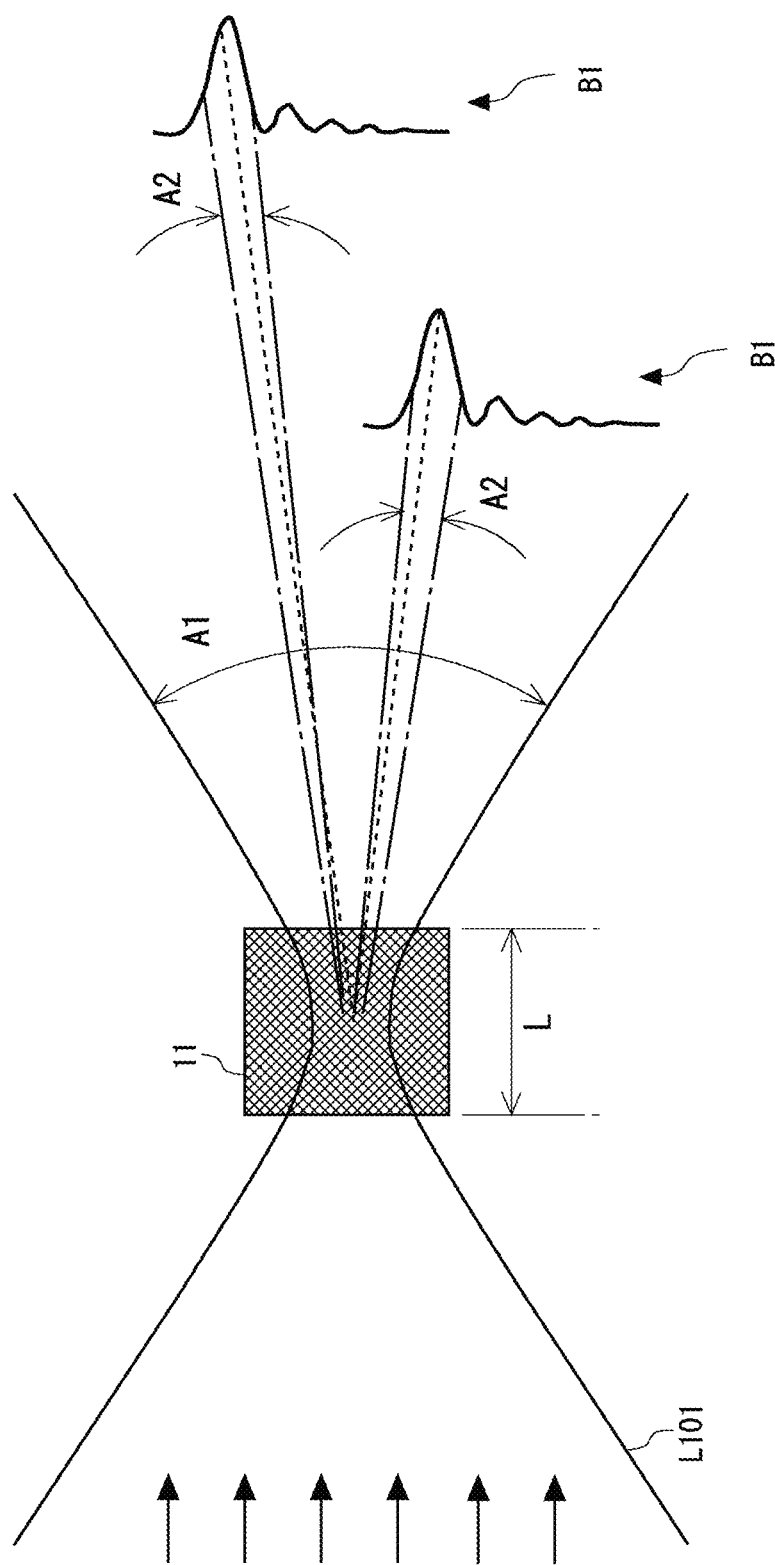
FIG. 2 is a diagram for explaining the angle of divergence of a second harmonic generated in a BBO crystal.

FIG. 2 is a schematic diagram showing a state in which visible light L101, which is incident light, is concentrated in a BBO crystal 11 having a length L (e.g., 10 mm). Six arrows indicate the incident direction of the visible light L101. An angle A1 (e.g., 7.4 mrad) represents the divergence angle of the incident light. An angle A2 represents an example of the divergence angle of the second harmonic. A waveform B1 schematically represents the light intensity distribution of the second harmonic. When the refractive index of the BBO crystal 11 changes for some reason, the angle that satisfies the phase matching condition changes and the propagation direction of the second harmonic changes within the range of the divergence angle of 7.4 mrad.

Figure 3:
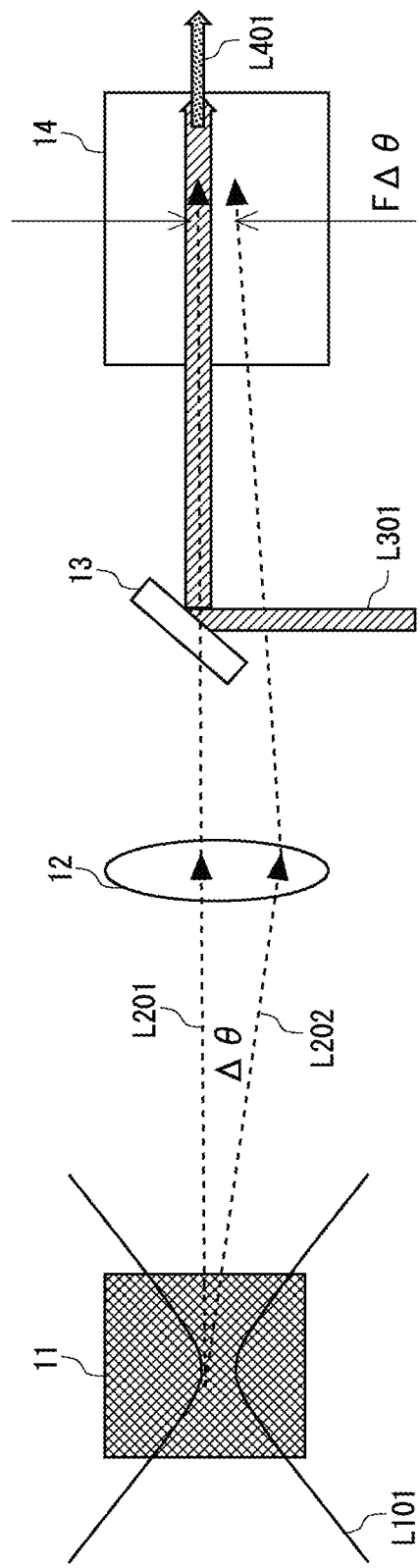
FIG. 3 is a configuration diagram showing a configuration of a light-source apparatus in related art.

The reason why the intensity of the deep UV light generated in the CLBO crystal changes will be descried with reference to FIG. 3. FIG. 3 is a schematic diagram showing a configuration of a light-source apparatus 10 in related art. The light-source apparatus 10 include a BBO crystal 11, a condensing lens 12, a beam splitter 13, and a CLBO crystal 14.

Visible light L101 having a wavelength of 470 nm and a certain divergence angle is incident on the BBO crystal 11. Further, it is assumed that the BBO crystal 11 generates UV light L201 having a wavelength of 235 nm and propagating in the horizontal direction. The UV light L201 passes through the condensing lens 12 having a focal length F, passes through the beam splitter 13, and is incident on the CLBO crystal 14. The UV light L201 is concentrated at a diameter of about 100 µm by the condensing lens 12. Further, IR light L301 having a wavelength of 1,080 nm is reflected by the beam splitter 13 and is incident on the CLBO crystal 14. In the CLBO crystal 14, the UV light L201 and the IR light L301 overlap each other. Similarly to the UV light L201, the IR light L301 may be concentrated at a diameter of about 100 µm. The CLBO crystal 14 generates deep UV light L401 having a wavelength of 193 nm, which is obtained by sum-frequency-mixing the UV light L201 and the IR light L301.

When the angle that satisfies the phase matching condition changes, the BBO crystal 11 generates UV light L202 whose propagation angle is changed from that of the UV light L101 by an angle $\Delta\theta$.

In this case, because of the principle of the fθ lens, the focal point in the CLBO crystal 14 is shifted by a distance $F\Delta\theta$. For example, in the case of F=200 mm, the focal point shifts by 100 µm as the angle $\Delta\theta$ changes by only a 0.5 mrad. Since the focal point is shifted by a distance equivalent to the diameter of the UV light L201, the UV light L201 and the IR light L301 do not overlap each other in the CLBO crystal 14, and the output of the deep UV light L401 having the wavelength of 193 nm significantly decreases.

Therefore, the technology for adjusting the phase matching of the BBO crystal 11 to increase the output of the UV light L201 in the related art is not satisfactory to maintain the output of the deep UV light L401 having the wavelength of 193 nm.

Further, the second harmonic (the UV light), which is an extraordinary-ray, has a light intensity distribution that is stretched on the plane containing the crystal axis by a phenomenon called walk-off. The angle between the propagation direction of the fundamental wave and that of the energy of the second harmonic is called a walk-off angle.

Figure 4:
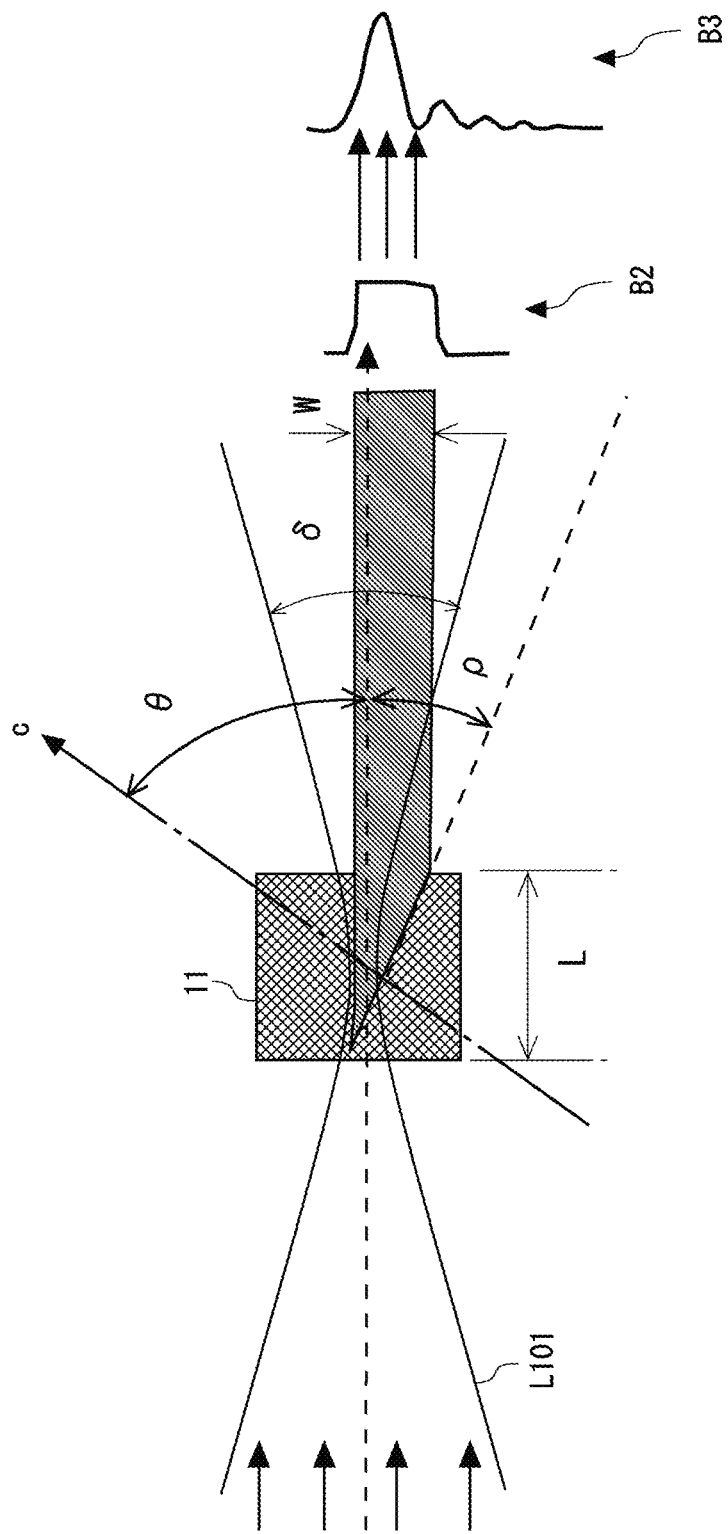
FIG. 4 is a diagram for explaining walk-off of UV light generated in a BBO crystal.

The walk-off will be described with reference to FIG. 4. c represents the crystal axis. δ represents the divergence angle of the visible light L101, which is incident on the BBO crystal 11. The phase matching angle θ of the BBO crystal 11, by which the second harmonic can be generated by using the visible light L101 having the wavelength of 470 nm as the incident light, is about 59° C. (θ=59° C.) and, the walk-off angle ρ is 78.9 mrad. When the crystal length L of the BBO crystal 11 is 10 mm and the beam diameter of the incident visible light L101 is 0.1 mm, the beam diameter W of the UV light L201 having the wavelength of 235 nm in the walk-off direction (i.e., the longitudinal direction in FIG. 4) is 0.1+10×0.0789~0.9 mm.

In general, the light intensity distribution of the second harmonic in the walk-off direction is substantially flat immediately after the light is emitted from the BBO crystal 11, and then changes in various fashions according to the distance from the BBO crystal 11 due to the diffraction phenomenon. When the second harmonic is concentrated in the CLBO crystal 14 by using a lens or the like in order to generate the deep UV light L401 having the wavelength of 193 nm, the light intensity distribution in the walk-off direction (also called the walk-off plane direction) at the focal point becomes a far-field image (pattern) which is also called a Fraunhofer diffraction pattern. A waveform B2 represents the light intensity distribution immediately after the light is emitted from the BBO crystal 11, and a waveform B3 represents the far-field image. Three arrows indicate that the flat shape included in the waveform B2 corresponds to the convex shape included in the waveform B3.

Figure 5:
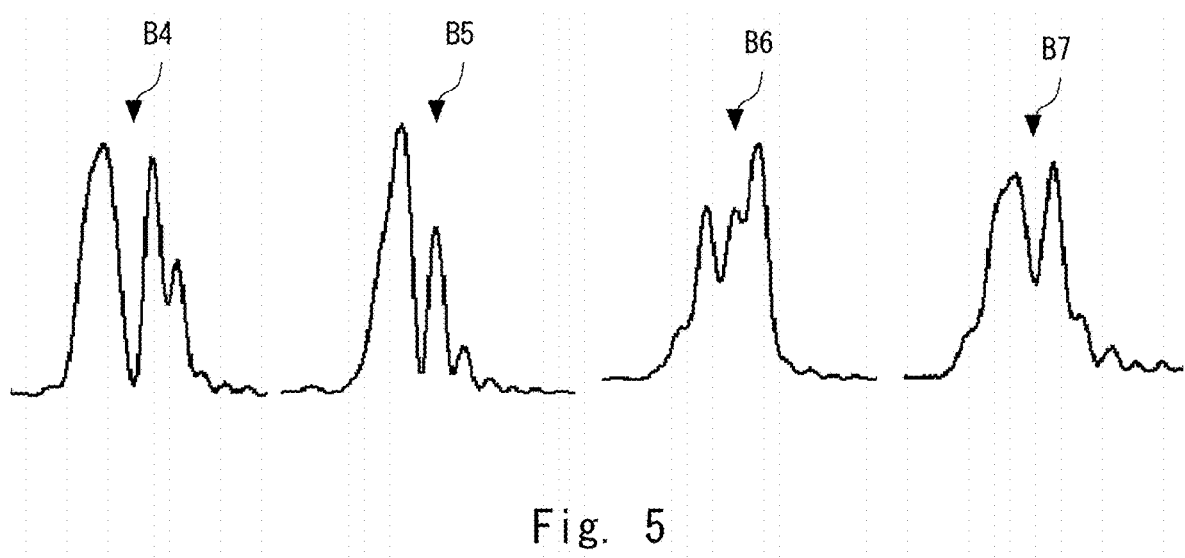
FIG. 5 is a graph for explaining a far-field image of UV light generated in a BBO crystal.

Four waveforms B4 to B7 shown in FIG. 5 represent the light intensity distributions in the walk-off direction on the focal plane, i.e., the result of measurement of the far-field images (patterns), when the UV light L201 is concentrated by using a lens having a focal point length of about 600 mm. The far-field image (pattern) was measured by a one-dimensional CCD (Charge-Coupled Device) sensor. The incident positions (the transmission positions) of the visible light L101 on (through) the BBO crystal 11 in the waveforms B4 to B7 differ from one another.

The inventors calculated representative positions (also called reference positions) from complicated light intensity distributions in the walk-off direction as shown in FIG. 5. The inventors have found that it is possible, by confining the representative position within a certain range on the CCD sensor, to keep the emitting direction substantially unchanged while substantially maximizing the output of the UV light L201.

The representative position is preferably, but not limited to, the peak position in the light intensity distribution or the center of gravity of the light intensity distribution within a certain range including the peak position.

Figure 6:
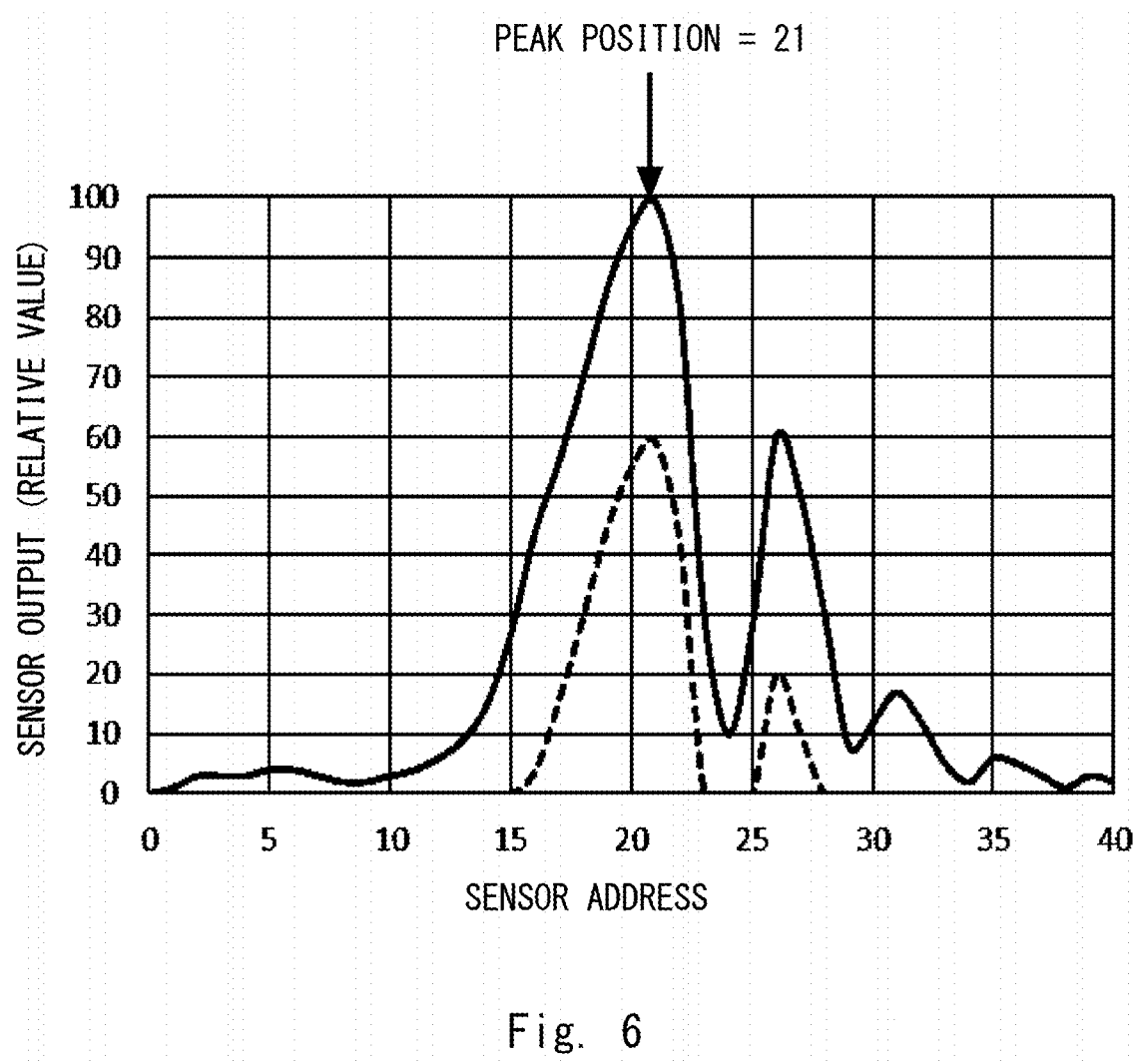
FIG. 6 is a diagram for explaining a method for calculating a peak position.
Figure 7:
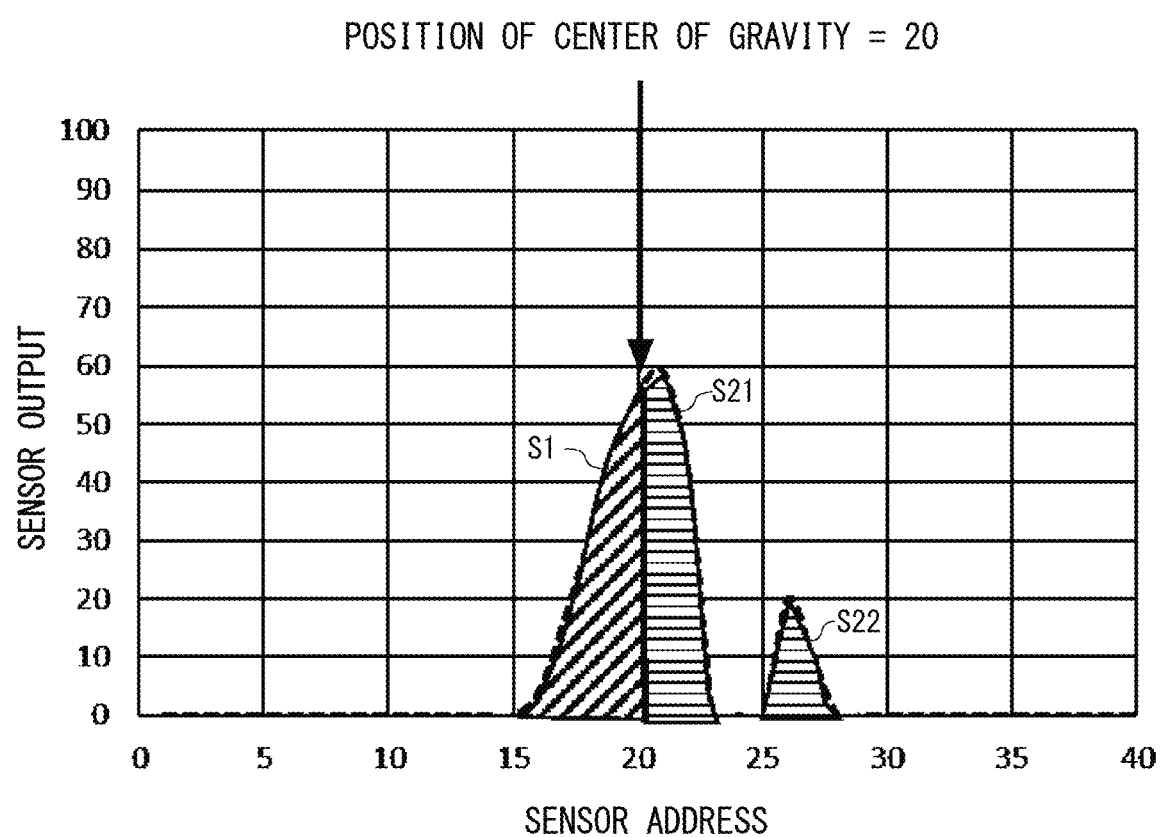
FIG. 7 is a diagram for explaining a method for calculating the position of the center of gravity.

Specific examples of the representative position will be described with reference to FIGS. 6 and 7. FIG. 6 shows a result of measurement of a far-field image (pattern) using a one-dimensional CCD sensor. The vertical axis represents the relative value of the output from each pixel (called the sensor output), and the horizontal axis represents the address of the pixel (called the sensor address). The solid line represents the measurement result, and the dotted line represents a result that was obtained by extracting parts where the sensor output exceeds "50". The graph (i.e., the curve) indicated by the dotted line is the same as the graph indicated by the solid line in FIG. 7, and is used to calculate the position of the center of gravity.

Sensor elements are arranged along the walk-off direction, and the horizontal axis represents the position in the walk-off direction. When the peak position in the light intensity distribution is used as the representative position, the representative position is calculated, for example, as "21".

A method for calculating the position of the center of gravity will be described in detail with reference to FIG. 7. In this case, the center of gravity of the light intensity distribution is set to "20" so that the area (i.e., the size of the area) to the left of the center of gravity (indicated as an area S1) is equal to the area to the right of the center of gravity (i.e., the sum of areas S21 and S22).

Based on the above-described study, the inventors of the present application have conceived an invention according to an embodiment.

First Embodiment

A light-source apparatus and an inspection apparatus according to a first embodiment will be described hereinafter with reference to the drawings.

(Light-Source Apparatus)

Figure 8:
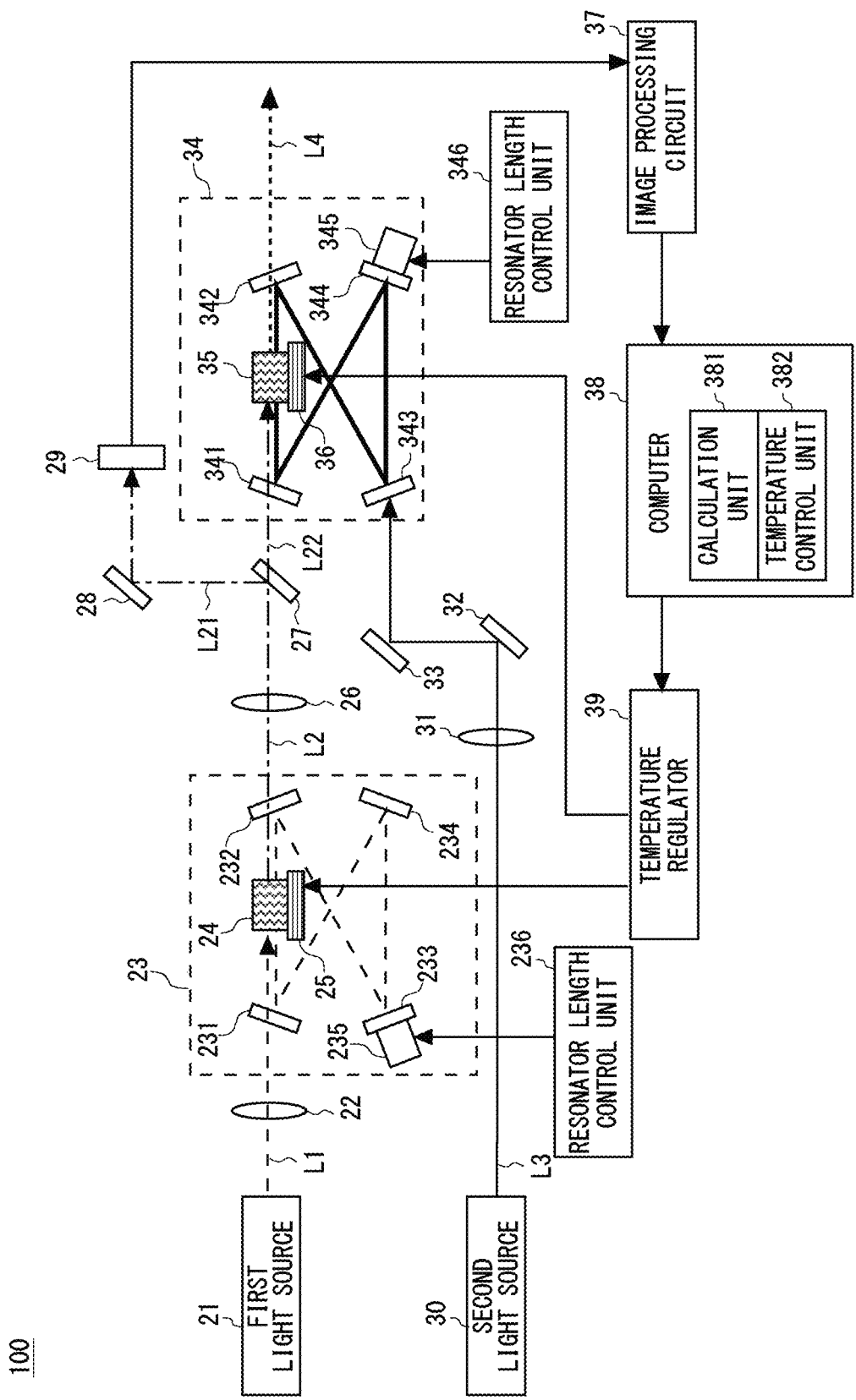
FIG. 8 is a configuration diagram showing a configuration of a light-source apparatus according to a first embodiment.

FIG. 8 shows a configuration of a light-source apparatus 100 according to the first embodiment. The light-source apparatus 100 includes a first light source 21, a condensing lens 22, a first external resonator 23, a BBO crystal 24, a first thermoelectric element 25, a condensing lens 26, a beam splitter 27, a mirror 28, a semiconductor sensor 29, a second light source 30, a condensing lens 31, a mirror 32, a mirror 33, a second external resonator 34, a CLBO crystal 35, a second thermoelectric element 36, an image processing circuit 37, a computer 38, and a temperature regulator 39.

The first light source 21 is a laser light source and outputs continuous output light. The first light source 21 generates visible light L1 in a wavelength range of 466 nm to 472 nm.

The visible light L1 emitted from the first light source 21 is concentrated by the condensing lens 22 and is incident on the first external resonator 23.

The first external resonator 23 includes an optical mirror 231, an optical mirror 232, an optical mirror 233, an optical mirror 234, an actuator 235, and a resonator length control unit 236. Each of the optical mirrors 231 to 234 is, for example, a concave mirror or a plane mirror. The visible light L1 is guided to the first external resonator 23 through the optical mirror 231, which is a semi-reflective mirror. The visible light L1 repeats the reflections on the optical mirrors 231 to 234 one by one.

The actuator 235 for adjusting the length of the first external resonator 23 is attached to one of the optical mirrors 231 to 234 (e.g., the optical mirror 233). The resonator length control unit 236 properly controls the actuator 235 so that the resonance of the first external resonator 23 is maintained.

The BBO crystal 24 is disposed inside the first external resonator 23 (e.g., between the optical mirrors 231 and 232).

The BBO crystal 24 generates UV light L2 in a wavelength range of 233 nm to 236 nm, which is the second harmonic of the visible light L1. Each of the entering and exiting surfaces of the BBO crystal 24 is coated with an anti-reflection film which is effective for both the visible light L1 and the second harmonic. Alternatively or additionally, the BBO crystal 24 may be processed into a Brewster angle by which the reflectance of the BBO crystal for the visible light L1 becomes substantially zero. The temperature of the BBO crystal 24 is controlled by the first thermoelectric element 25.

The first thermoelectric element 25 is, for example, a Peltier element and controls the temperature of the BBO crystal 24 in response to a control signal from the temperature regulator 39. The BBO crystal 24 may be placed on a stage including the first thermoelectric element 25.

The UV light L2 generated in the BBO crystal 24 is taken out from the optical mirror 232. The optical mirror 232 is, for example, coated with a film that has a high-reflection property for the wavelength of the visible light L1 and an anti-reflection property for the wavelength of the UV light L2. Note that a dichroic mirror or the like that allows the visible light L1 to pass therethrough and reflects the UV light L2 may be disposed between the optical mirror 232 and the BBO crystal 24.

The UV light L2 from the first external resonator 23 is concentrated in the condensing lens 26 and is incident on the beam splitter 27. The beam splitter 27 may be a beam sampler. The beam splitter 27 allows a part of the incident UV light L2 to pass therethrough, and reflects a part thereof. Therefore, the beam splitter 27 divides the incident UV light L2 into two UV light beams L21 and L22. The part of the UV light L2 reflected by the beam splitter 27 is referred to as UV light L21, and the part of the UV light L2 that passed through the beam splitter 27 is referred to as UV light L22.

The UV light L21 reflected by the beam splitter 27 is reflected by the mirror 28 and is incident on the semiconductor sensor 29. The UV light L22, which has passed through the beam splitter 27, is incident on the second external resonator 34.

The semiconductor sensor 29 is a one- or two-dimensional semiconductor sensor (e.g., a CCD sensor) and takes an image of a far-field image (pattern) of the UV light L2 generated in the BBO crystal 24. The semiconductor sensor 29 may be a CMOS (Complementary Metal Oxide Semiconductor) sensor, a TDI (Time Delay Integration) sensor, or the like. The semiconductor sensor 29 takes an image of the light intensity distribution of the UV light L21. In the case where the semiconductor sensor 29 is a one-dimensional semiconductor sensor (i.e., a line sensor), the semiconductor sensor 29 is (i.e., the sensor elements of the semiconductor sensor 29 are) arranged so that its line direction coincides with the walk-off direction. The semiconductor sensor 29 outputs an output signal to the image processing circuit 37.

The semiconductor sensor 29 is disposed near the far-field image plane that is formed through optical elements (such as the condensing lens 26) disposed on the optical path of the UV light L2. Since the condensing lens 26 concentrates the UV light L2 in the CLBO crystal 35, the CLBO crystal 35 contains the far-field image plane of the UV light L2 generated in the BBO crystal 24. The semiconductor sensor 29 is disposed on a plane conjugate with the far-field image plane contained in the CLBO crystal 35.

In the case where the semiconductor sensor 29 is a line sensor, the UV light L21 may be stretched in a direction perpendicular to the line direction by using a lengthwise cylindrical lens. As a result, the beam of the UV light L21 becomes less likely to be deviated from the semiconductor sensor 29. When the temperature of the BBO crystal 24 is changed, the beam of the UV light L21 moves along the line direction.

The second light source 30 is a laser light source and outputs continuous output light. The second light source 30 generates IR light L3 in a wavelength range of 1,071 nm to 1,138 nm.

The IR light L3 emitted from the second light source 30 is concentrated by the condensing lens 31, reflected by the mirrors 32 and 33, and is incident on the second external resonator 34.

The second external resonator 34 includes an optical mirror 341, an optical mirror 342, an optical mirror 343, an optical mirror 344, an actuator 345, and a resonator length control unit 346. Each of the optical mirrors 341 to 344 is, for example, a concave mirror or a plane mirror.

The UV light L22 is guided to the second external resonator 34 through the optical mirror 341, which is a semi-reflective mirror. The IR light L3 is guided to the second external resonator 34 through the optical mirror 343, which is a semi-reflective mirror. The IR light L3 repeats the reflections on the optical mirrors 341 to 344 one by one.

The actuator 345 for adjusting the length of the second external resonator 34 is attached to one of the optical mirrors 341 to 344 (e.g., the optical mirror 344). The resonator length control unit 346 properly controls the actuator 345 so that the resonance of the second external resonator 34 is maintained.

The CLBO crystal 35 is disposed inside the second external resonator 34 (e.g., between the optical mirrors 341 and 342). The CLBO crystal 35 generates deep UV light L4 having a wavelength of about 193 nm, which is the sum-frequency-mixed light of the UV light L22 and the IR light L3. Each of the entering and exiting surfaces of the CLBO crystal 35 are coated with an anti-reflection film which is effective for some or all of the UV light L22, the IR light L3, and the deep UV light L4. Alternatively or additionally, the CLBO crystal 35 may be processed into a Brewster angle by which the reflectance of the CLBO crystal for the IR light L3 becomes substantially zero. The temperature of the CLBO crystal 35 is controlled by the second thermoelectric element 36.

The second thermoelectric element 36 controls the temperature of the CLBO crystal 35 in response to a control signal from the temperature regulator 39. The second thermoelectric element 36 is, for example, a Peltier element. The CLBO crystal 35 may be placed on a stage including the second thermoelectric element 36.

The deep UV light L4 generated in the CLBO crystal 35 is taken out from the optical mirror 342. The optical mirror 342 is, for example, coated with a film that has a high-reflection property for the wavelengths of the UV light L2 and the IR light L3, and an anti-reflection property for the wavelength of the deep UV light L4. Note that a dichroic mirror or the like that reflects the deep UV light L4 and allows the IR light L3 to pass therethrough may be disposed between the CLBO crystal 35 and the optical mirror 342. The deep UV light L4 taken out from the second external resonator 34 is used as illumination light when a photomask or the like is inspected. Further, a beam splitter and a photodiode (not shown) are provided on the optical path of the deep UV light L4, and the output of the deep UV light L4 is monitored by the photodiode.

The image processing circuit 37 processes the output signal of the semiconductor sensor 29 and thereby generates a signal representing the far-field image (pattern) of the UV light L2. The image processing circuit 37 outputs the generated signal to the computer 38.

The computer 38 includes a processor, a memory, and the like. The computer 38 includes a calculation unit 381 and a temperature control unit 382.

The calculation unit 381 calculates the representative position of the light intensity distribution detected by the semiconductor sensor 29. As described above, the representative position may be, but not limited to, the peak position or the position of the center of gravity. The calculation unit 381 outputs the calculated representative position to the temperature control unit 382.

The temperature control unit 382 controls the temperature of the BBO crystal 24 so that the representative position is confined within a predetermined range. That is, the temperature control unit 382 determines the amount of adjustment of the temperature of the first thermoelectric element 25 (hereinafter also referred to as the first temperature correction amount) so that the representative position is confined within the predetermined range, and outputs the determined adjustment amount to the temperature regulator 39. Note that details of the adjustment method will be described later. Then, the temperature control unit 382 determines the amount of adjustment of the temperature of the second thermoelectric element 36 (hereinafter also referred to as the second temperature correction amount) so that the output of the deep UV light L4 is maximized, and outputs the determined adjustment amount to the temperature regulator 39.

The temperature regulator 39 sets and controls the temperature of the first thermoelectric element 25 according to the first temperature correction amount determined by the computer 38. Further, the temperature regulator 39 also sets and controls the temperature of the second thermoelectric element 36 according to the second temperature correction amount determined by the computer 38.

When the light-source apparatus 100 is adjusted at the start of the inspection or the like, the temperature of the BBO crystal 24 is adjusted so that the output of the UV light L2 is maximized. The output of the UV light L2 may be measured by the semiconductor sensor 29. Then, the incident angle of the UV light L22 on the CLBO crystal 35 and the temperature of the CLBO crystal 35 (the temperature of the second thermoelectric element 36) are adjusted so that the output of the deep UV light L4 is maximized. After the adjustment, the representative position (e.g., the position of the center of gravity) of the light intensity distribution measured by the semiconductor sensor 29 is calculated and stored as the reference position in a storage of the computer 38. The temperature control unit 382 of the computer 38 sets, when the representative position deviates from the reference position, the temperature of the BBO crystal 24 (the temperature of the first thermoelectric element 25) so that the representative position returns to the reference position.

In the case where the sum frequency is generated by concentrating the UV light L2 generated in the BBO crystal 24 and the IR light L3 generated in the second light source 30 inside the CLBO crystal 35 in such a manner that their axes coincide with each other, and deep UV light L4 having a wavelength of about 193 nm is thereby generated, it is possible to make the UV light L2 and the IR light L3 overlap each other inside the CLBO crystal 35 by controlling the temperature of the BBO crystal 24 as described above. In this way, it is possible to generate high-power and stable deep UV light L4 having the wavelength of 193 nm for a long time.

It is sufficient if the beam splitter 27 for taking out the UV light L12 is provided behind the condensing lens 26 and the semiconductor sensor 29 is disposed on a plane conjugate with the CLBO crystal 35.

Figure 9:
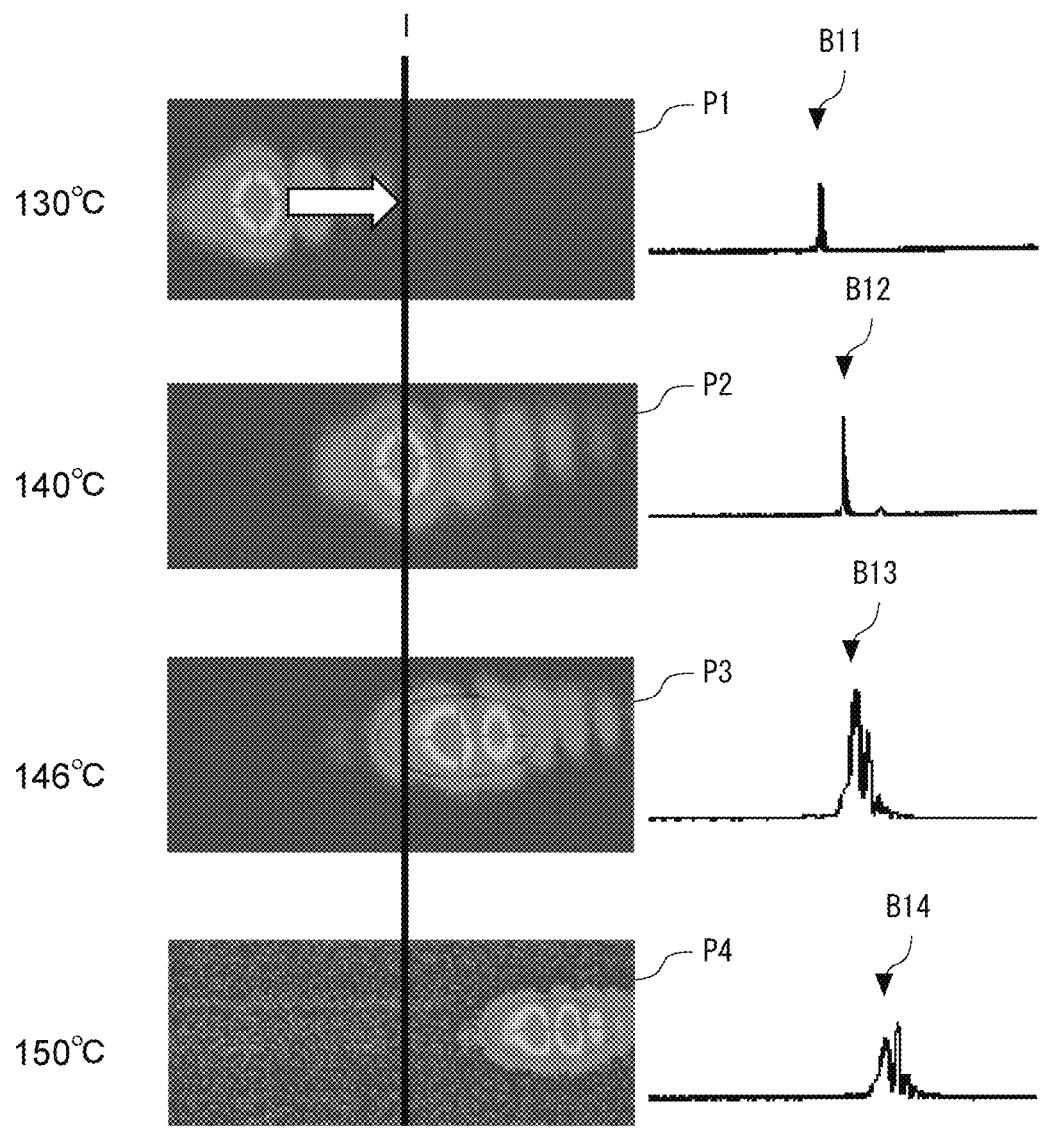
FIG. 9 shows rough images and graphs showing changes in the shape of a light intensity distribution.

Changes in the shape of the light intensity distribution when the temperature of the BBO crystal 24 is changed will be described with reference to FIG. 9. Waveforms B11, B12, B13 and B14 represent light intensity distributions measured by the semiconductor sensor 29 when the temperature of the BBO crystal 24 is 130° C., 140° C., 146° C. and 150° C., respectively. Here, attention is paid to the shapes of the waveforms B11 to B14, rather than to their representative positions. The shapes of the waveforms B11 to B14 change depends on the temperature of the BBO crystal 24, and when the temperature is 150° C., a side lobe(s) (i.e., an area outside the main lobe) is larger than the main lobe (the elliptical area containing the point at which the light intensity is the largest). What is considered to be an important matter is whether the side lobe(s) should be taken into consideration when the representative position is determined. Therefore, the inventors have examined whether only the main lobe of the UV light L2 is converted into the deep UV light L4 or both the main lobe and a side lobe(s) of the UV light L2 are converted into the deep UV light L4.

Note that profiles P1, P2, P3 and P4 represent beam profiles of the UV light L2 when the temperature of the BBO crystal is 130° C., 140° C., 146° C. and 150° C., respectively. The outputs of the UV light L2 are expressed by gray scales. The profiles P1 to P4 were acquired by a profiler. A line 1 represents the position of the beam of the UV light L2 at which the output of the deep UV light L4 is maximized. In the case where the temperature of the BBO crystal 24 is 130° C., when the temperature is increased by 10° C., the beam moves in a direction indicated by a blanked arrow (i.e., a white arrow), so that the output of the deep UV light L4 is maximized.

Figure 10:
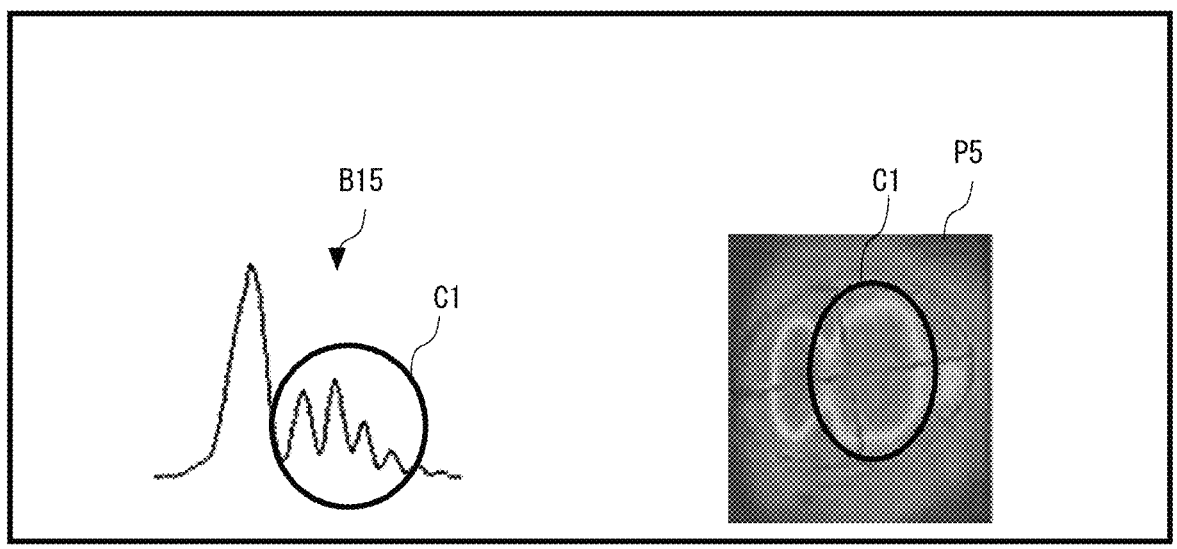
FIG. 10 shows a graph and an image for explaining a conversion of side lobes of UV light into deep UV light.

FIG. 10 shows a waveform B15 representing a light intensity distribution of the UV light L21 and a beam profile P5 of the deep UV light L4. It can be understood that since both the waveform B15 and the beam profile P5 contain a side lobe(s) C1, the side lobe(s) of the UV light L2 was also converted into the deep UV light L4.

Figure 11:
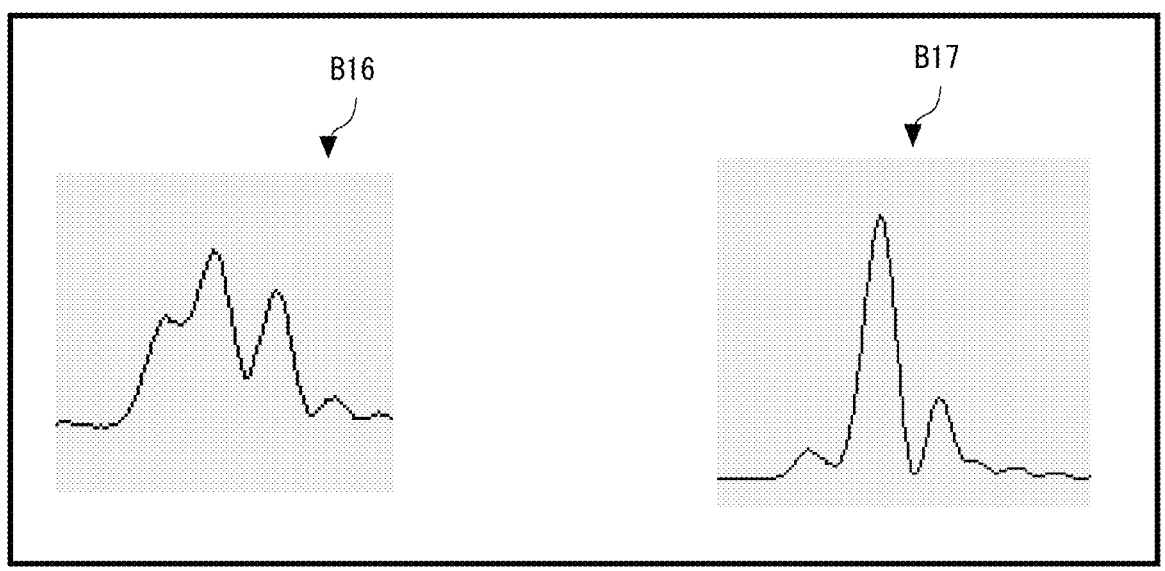
FIG. 11 shows graphs for explaining a conversion of side lobes of UV light into deep UV light.

FIG. 11 shows waveforms B16 and B17 representing light intensity distributions of the UV light L21. The side lobe(s) of the waveform B16 is large and the side lobe(s) of the waveform B17 is small. The inventors have found that the conversion efficiency of UV light L2 having a large side lobe, like the waveform B16, is sometimes higher than that of UV light L2 having a small side lobe, like the waveform B17. Based on this fact, it can also be understood that the side lobe(s) of the UV light L2 was converted into the deep UV light L4.

Considering that the side lobe(s) is converted into the deep UV light L4, it is preferred that the calculation unit 381 sets the position of the center of gravity as the representative position. The calculation unit 381 of the computer 38 may calculate, as the representative position, the position of the center of gravity in a range of +/−50 pixels centered at the peak position.

Figure 12:
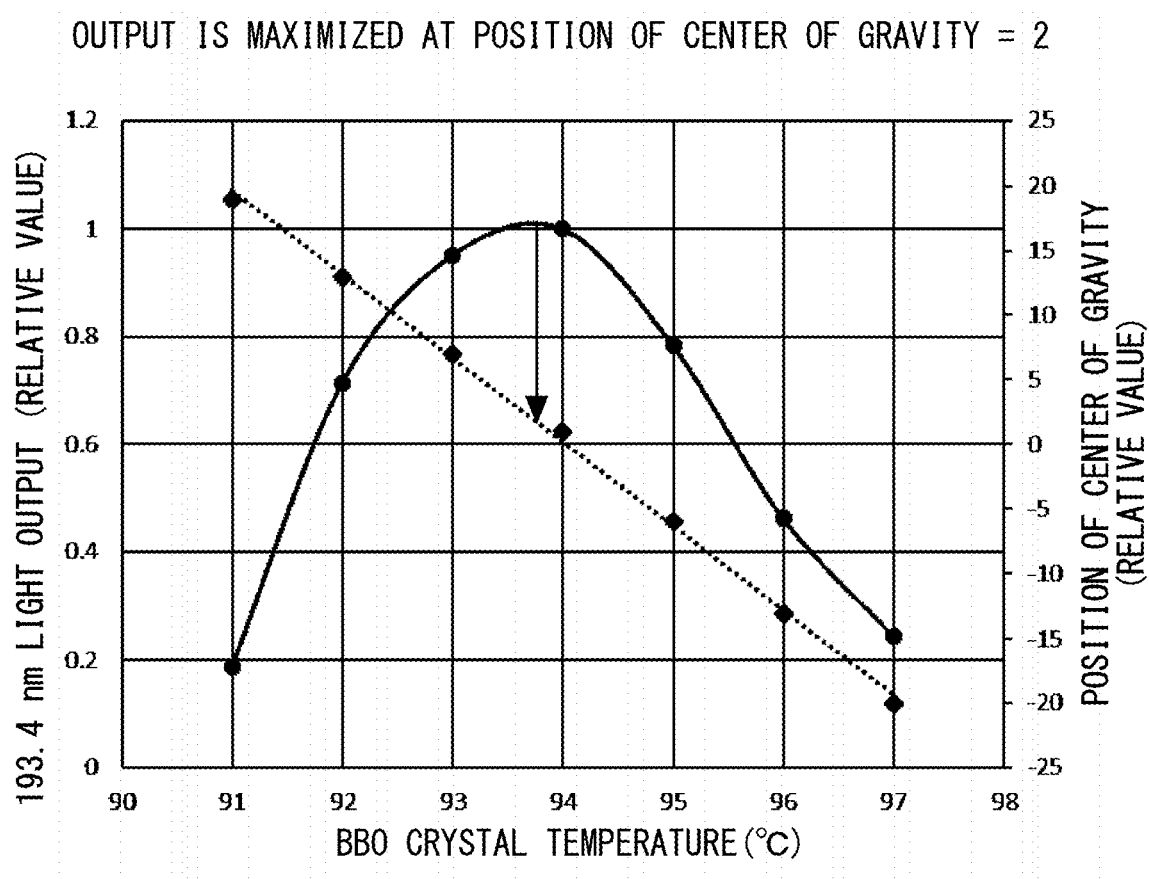
FIG. 12 is a graph showing a relationship between temperatures of a BBO crystal and positions of the center of gravity thereof.

FIG. 12 shows a dotted-line graph (i.e., dotted-straight line) representing a relationship between the temperature of the BBO crystal 24 and the position of the center of gravity, and a solid-line graph (i.e., solid-line curve) representing a relationship between the temperature of the BBO crystal 24 and the output of the deep UV light L4. The horizontal axis represents the temperature of the BBO crystal 24, and the vertical axis represents the position of the center of gravity (relative values) or the output of the deep UV light L4 (relative values). The temperature of the BBO crystal 24 at which the output of the deep UV light L4 is the highest is about 94° C., and the position of the center of gravity in this state is "2". That is, the output of the deep UV light L4 is maximized when the position of the center of gravity is "2".

The temperature of the BBO crystal 24 at which the output of the deep UV light L4 is maximized constantly changes due to changes in the refractive index in the BBO crystal 24, changes in the temperature distribution, and shifts of the point at which the beam passes through (at which the beam is incident), all of which occur when high-power UV light L2 is being generated. Therefore, the output of the deep UV light L4 may not be maintained at the maximum power even when the temperature of the BBO crystal 24 is kept at 94° C. In particular, when the BBO crystal 24 is spatially translated (i.e., is moved in a straight line) as optical damage occurs, the visible light L1 may be incident on a part of the BBO crystal having a different temperature. In such a state, in some cases, the UV light L2 is not generated unless the temperature of the BBO crystal 24 is adjusted to about 90° C.

Figure 13:
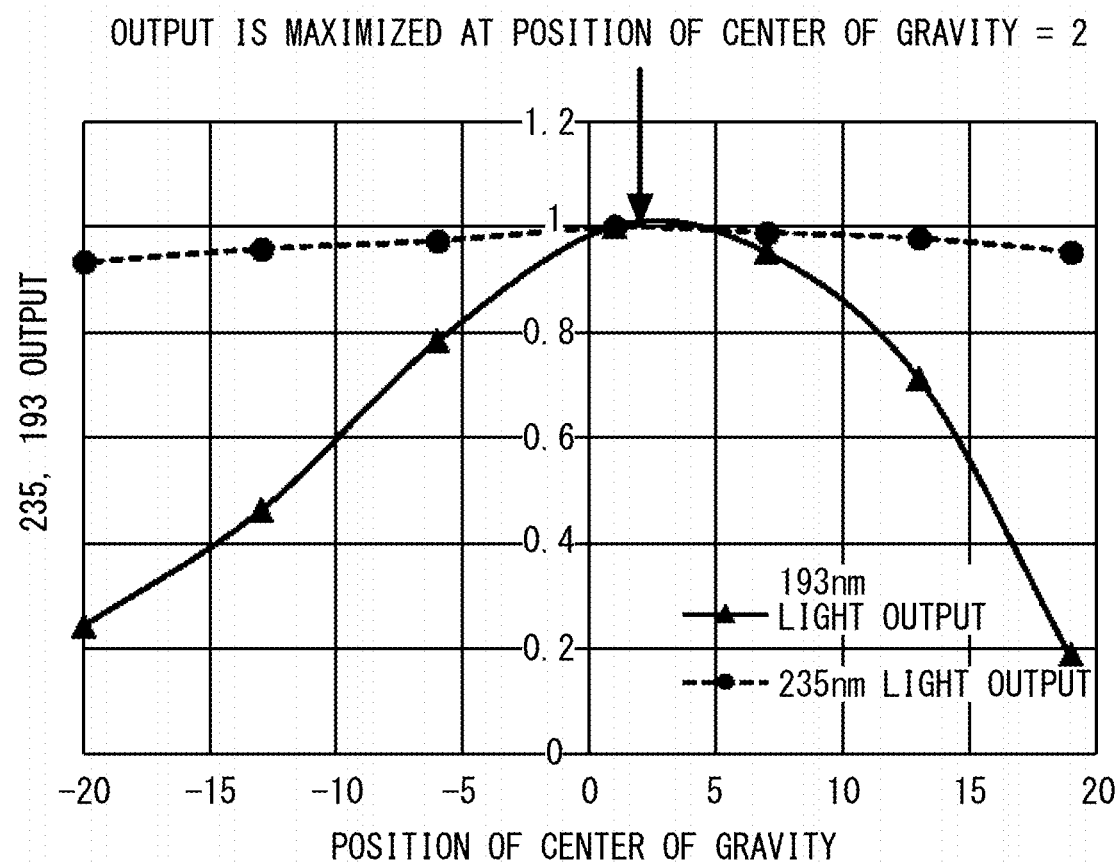
FIG. 13 is a graph showing a relationship between outputs of UV light or deep UV light and positions of the center of gravity.

As described above, it has been experimentally found that the representative position at which the output of the UV light L2 is maximized is always the same position. FIG. 13 shows a solid-line graph (i.e., a solid-line curve) representing a relationship between the output of the deep UV light L4 and the position of the center of gravity, and a dotted-line graph (i.e., a dotted-line curve) representing a relationship between the output of the UV light L2 and the position of the center of gravity. Referring to FIG. 13, it can be seen that the outputs of the deep UV light L4 and UV light L2 are maximized when the position of the center of gravity is "2".

When the representative positions are the same as each other, the position of the UV light L22 in the CLBO crystal 35 (e.g., the center of gravity of the light intensity distribution of the UV light L22 or the peak position in the light intensity distribution of the UV light L22) is the same as each other. Therefore, the overlap between the UV light L22 and the IR light L3 in the CLBO crystal 35 is always optimized.

Next, a method for determining a temperature correction amount of the first thermoelectric element 25 will be described. As described above with reference to FIG. 12, the relationship between the representative position and the temperature of the BBO crystal 24 is expressed by roughly a straight line. Therefore, it is possible to easily calculate the necessary amount of adjustment of the temperature (the temperature correction amount) from the difference between the representative position and the reference position by using a linear equation, and thereby to make the representative position roughly coincide with the reference position. That is, the temperature control unit 382 of the computer 38 can determine the temperature correction amount of the BBO crystal based on the linear equation representing the relationship between the representative position and the temperature of the BBO crystal 24.

Figure 14:
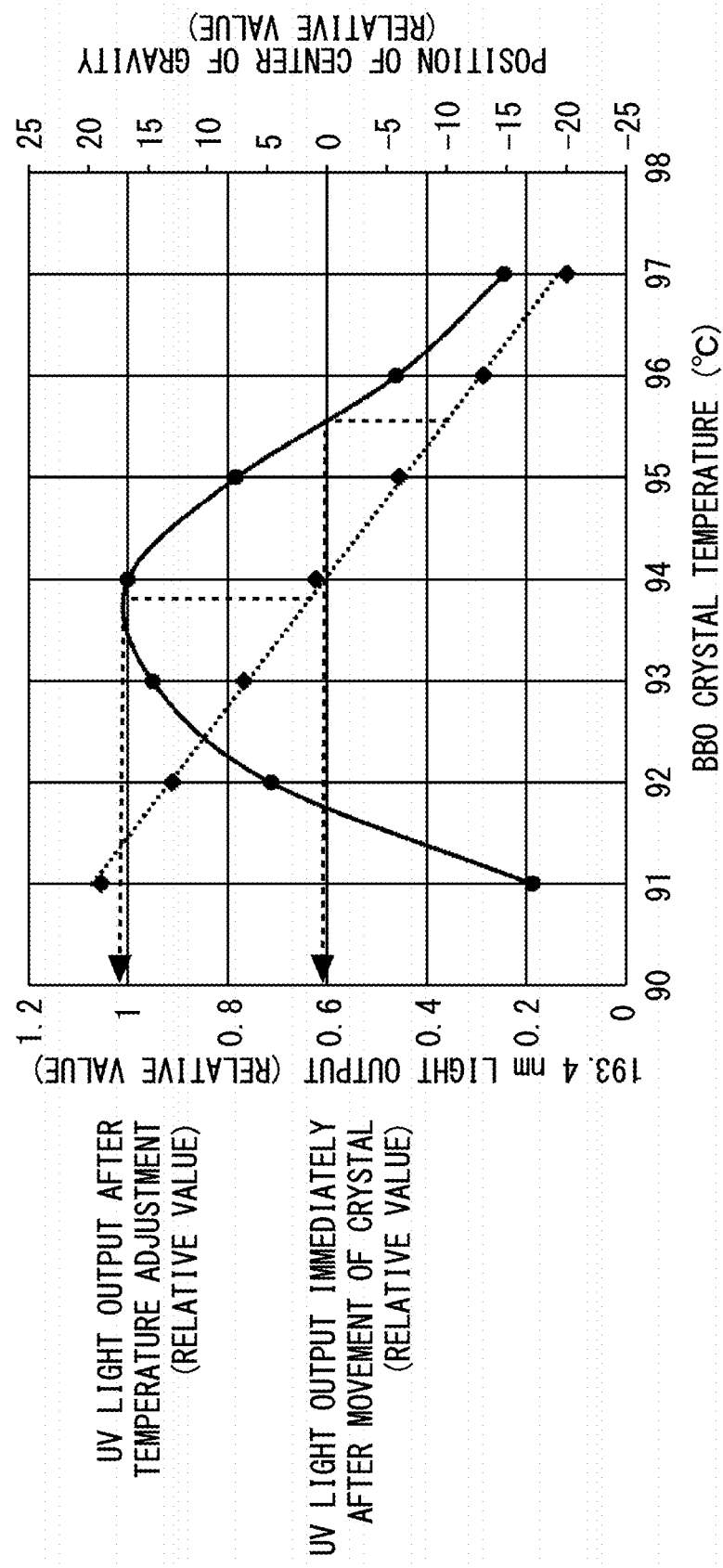
FIG. 14 is a graph for explaining a method for determining an amount of correction of a temperature.
Figure 15:
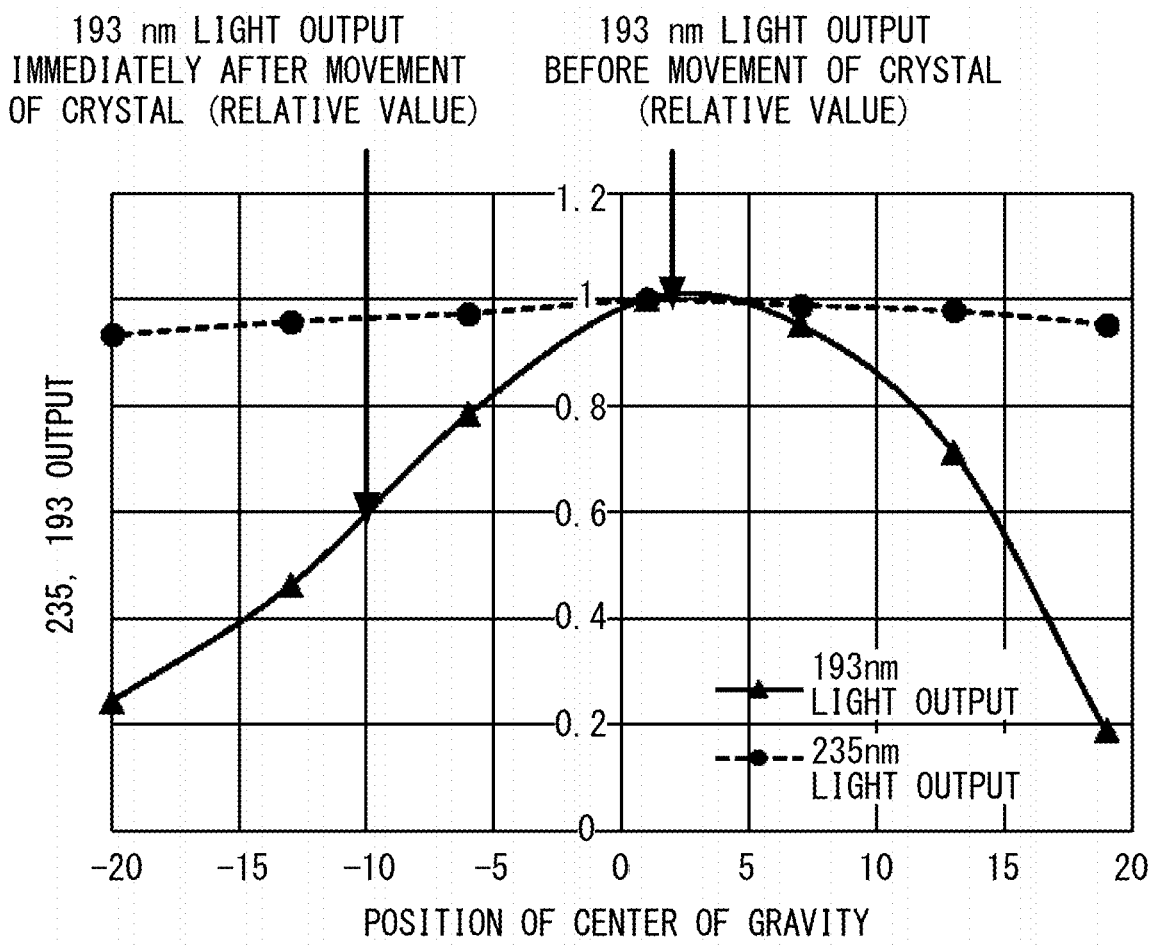
FIG. 15 is a graph for explaining a method for determining an amount of correction of a temperature.

The method for determining the temperature correction amount will be described in detail with reference to FIGS. 14 and 15. Similar to FIG. 12, FIG. 14 shows a dotted-line graph (i.e., dotted-straight line) representing a relationship between the temperature of the BBO crystal 24 and the position of the center of gravity, and a solid-line graph (i.e., solid-line curve) representing a relationship between the temperature of the BBO crystal 24 and the output of the deep UV light L4. Similar to the position of the center of gravity shown in FIG. 10, FIG. 15 shows a solid-line graph (i.e., solid-line curve) representing a relationship between the output of the deep UV light L4 and the position of the center of gravity, and a dotted-line graph (i.e., dotted-line curve) representing a relationship between the output of the UV light L2 and the position of the center of gravity. Referring to FIG. 15, the reference position, which is the initial value of the position of the center of gravity, is set to "2" at which the output of the deep UV light L4 is maximized.

Here, it is assumed that the BBO crystal 24 is spatially moved and the position of the center of gravity has changed to "−10". Referring to FIG. 15, it can be seen that when the position of the center of gravity changes from "2" to "−10", the output of the deep UV light L4 decreases by 40% and becomes about 60% of the output before the movement. Therefore, even if the output of the UV light L2 increases by 20% by spatially moving the BBO crystal 24, the output of the deep UV light L4 immediately after the movement is 72% (1.2×0.6=0.72) of the output of the deep UV light L4 before the movement.

Referring to the dotted-line graph shown in FIG. 14, based on the temperature of the BBO crystal 24 when the position of the center of gravity is "−10" and that when the position of the center of gravity is "2", it can be understood that the temperature of the BBO crystal 24 needs to be lowered by about 2° C. in order to move the position of the center of gravity from "−10" to "2". When the temperature of the BBO crystal 24 (the temperature of the first thermoelectric element 25) is lowered by 2.0° C. through a command or the like by the computer 38, and hence the position of the center of gravity is returned to "2", which is the position before the movement of the BBO crystal 24, the output of the deep UV light L4 relative to the output of the UV light L2 increases by 40%. Since the output of the deep UV light L4 is roughly proportional to that of the UV light L2, the output of the deep UV light L4 increases to 1.2 times of the output before the movement of the BBO crystal 24.

As described above, the one- or two-dimensional semiconductor sensor 29 is disposed on the focal plane of the UV light L2 emitted from the BBO crystal 24, which is formed by the condensing lens 26, and the difference between the representative position obtained by (i.e., calculated from) the output of the semiconductor sensor 29 and the reference position is calculated. Then, by performing control so that the temperature difference corresponding to the aforementioned difference is eliminated (i.e., becomes zero), it is possible to confine the emitting direction of the UV light L2 within a certain range while maximizing the output thereof (i.e., maintaining the maximum state of the output thereof).

Figure 16:
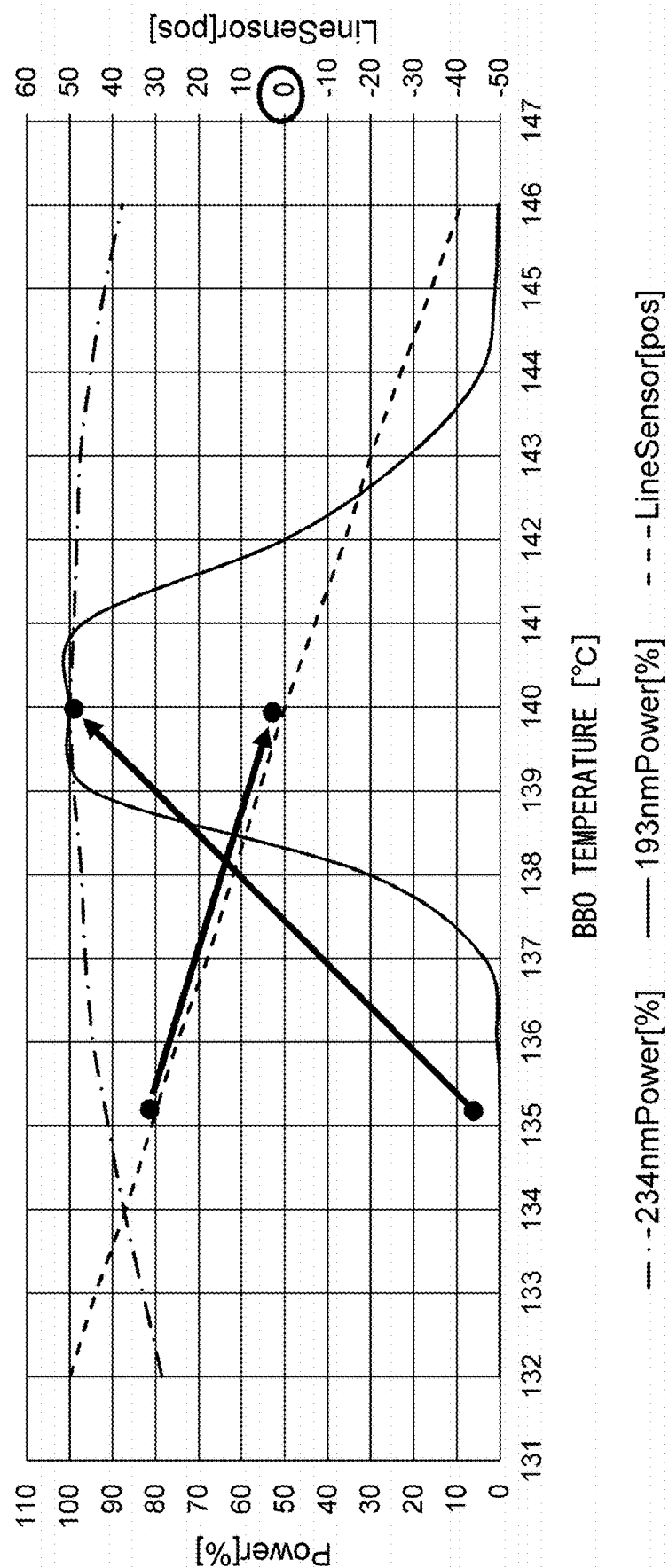
FIG. 16 is a graph for explaining a method for determining an amount of correction of a temperature.

A supplementary description will be given for the method for determining the temperature correction amount with reference to FIG. 16. FIG. 16 shows a dotted-line graph (i.e., dotted-straight line) representing a relationship between the temperature of the BBO crystal 24 and the representative position, and a dashed-line graph (i.e., dashed-line curve) representing a relationship between the temperature of the BBO crystal 24 and the output of the UV light L2, and a solid-line graph (i.e., solid-line curve) representing a relationship between the temperature of the BBO crystal 24 and the output of the deep UV light L4. The horizontal axis represents the temperature of the BBO crystal 24, and the vertical axis represents the output of the UV light L2, the output of the deep UV light L4, or the representative position. The output of the deep UV light L4 is adjusted so that it is maximized when the representative position is "0". The relationship between the representative position and the temperature of the BBO crystal 24 is linear, so that the temperature correction amount can be easily calculated from the representative position. It is assumed that, for example, the BBO crystal is at 135° C. and the output of the deep UV light L4 is close to zero. In this case, the temperature of the BBO crystal 24 cannot be properly controlled by the technology in related art. In contrast, when the light-source apparatus 100 is used, it is possible to easily calculate the temperature correction amount (e.g., +5° C.) based on the deviation of the representative position (e.g., +30), meaning that the light-source apparatus 100 has a fast return speed and is highly reliable.

Figure 17:
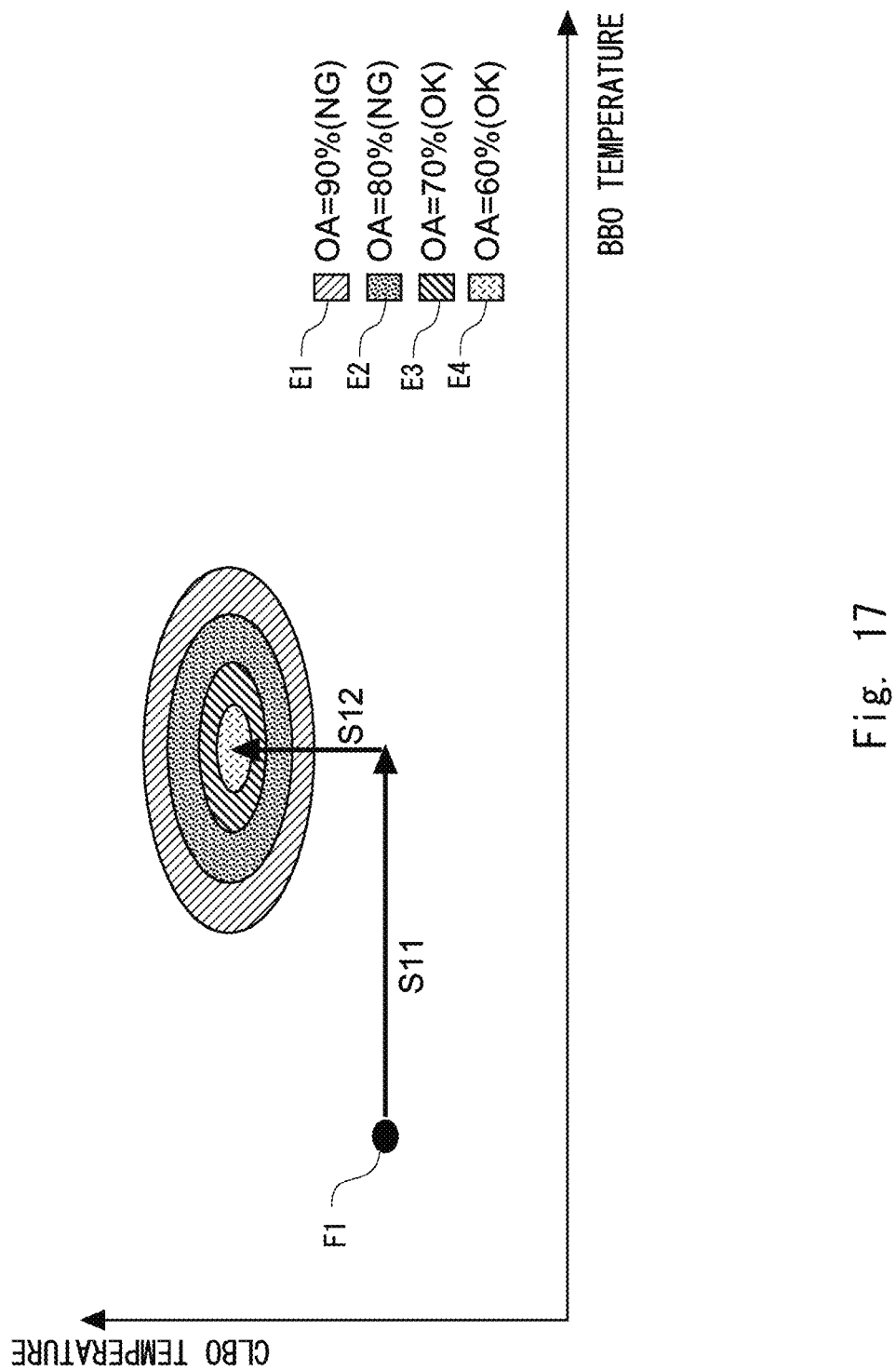
FIG. 17 is a schematic diagram showing an outline of a method for adjusting the temperatures of BBO and CLBO crystals.

FIG. 17 is a schematic diagram showing an outline of the method for adjusting the temperatures of the BBO crystal 24 and the CLBO crystal 35. The horizontal axis represents the temperature of the BBO crystal 24 and the vertical axis represents the temperature of the CLBO crystal 35. Areas E1, E2, E3, and E4 represent areas where the ratio of amount of light required for the inspection to the output of the deep UV light L4 is 90 to 100%, 80 to 90%, 70 to 80%, and 60 to 70%, respectively. For example, when the above-described ratio is 85%, it falls within the area E2. Therefore, the inspection can be performed for the time being, but it is determined that the margin of the amount of light of the deep UV light L4 is small (NG). A point F1 represents the temperature of the BBO crystal 24 and the temperature of the CLBO crystal 35 immediately after the start-up of the apparatus or after the movement of the crystal. In this case, the above-described ratio exceeds 100%, and hence the temperature is adjusted so that the point indicating the temperature falls within the area E3 or E4.

In this case, firstly, the representative position is calculated and the temperature of the BBO crystal 24 is corrected based on the representative position (Step S11). Then, the temperature of the CLBO crystal 35 is corrected so that the output of the deep UV light L4 increases (Step S12). When the technology in related art was used, the temperature adjustment time of the BBO crystal 24 and CLBO crystal 35 was about seven minutes. In contrast, when the above-described adjustment method was used, the adjustment time was about one minute.

Lastly, advantageous effects of the light-source apparatus 100 according to the first embodiment will be described. By using a light source that generates UV light L1 by generating the second harmonic using the BBO crystal 24, it is possible to continue maximizing the output of the UV light L2 while controlling (i.e., confining) the output of the UV light L2 within a certain range even when the phase matching condition change and regardless of the reason for the change.

In particular, when the BBO crystal 24 is spatially translated (i.e., is moved in a straight line) and visible light L1 is incident (i.e., passes therethrough) at a place where the refractive index is different from that before the translation, the optimum temperature of the BBO crystal 24 may widely change. In this case, even if the output of the deep UV light L4 having the wavelength of 193 nm cannot be maintained (i.e., the output of the CLBO crystal 35 ceases), it is possible to immediately calculate the necessary temperature correction amount by the computer 38, adjust the BBO crystal 24 to the optimum temperature in a short time of about 10 seconds, and restore the output of the deep UV light L4. Further, the light-source apparatus 100 can keep the state in which the output of the deep UV light L4 is the maximum.

In this way, when the UV light L2 having the wavelength of 235 nm or the deep UV light L4 having the wavelength of 193 nm, which is the sum-frequency-mixed light of the UV light L2 and the IR light L3, is used for a semiconductor inspection apparatus, it is possible to operate the inspection apparatus for a long period of time in a stable manner.

(Inspection Apparatus)

Figure 18:
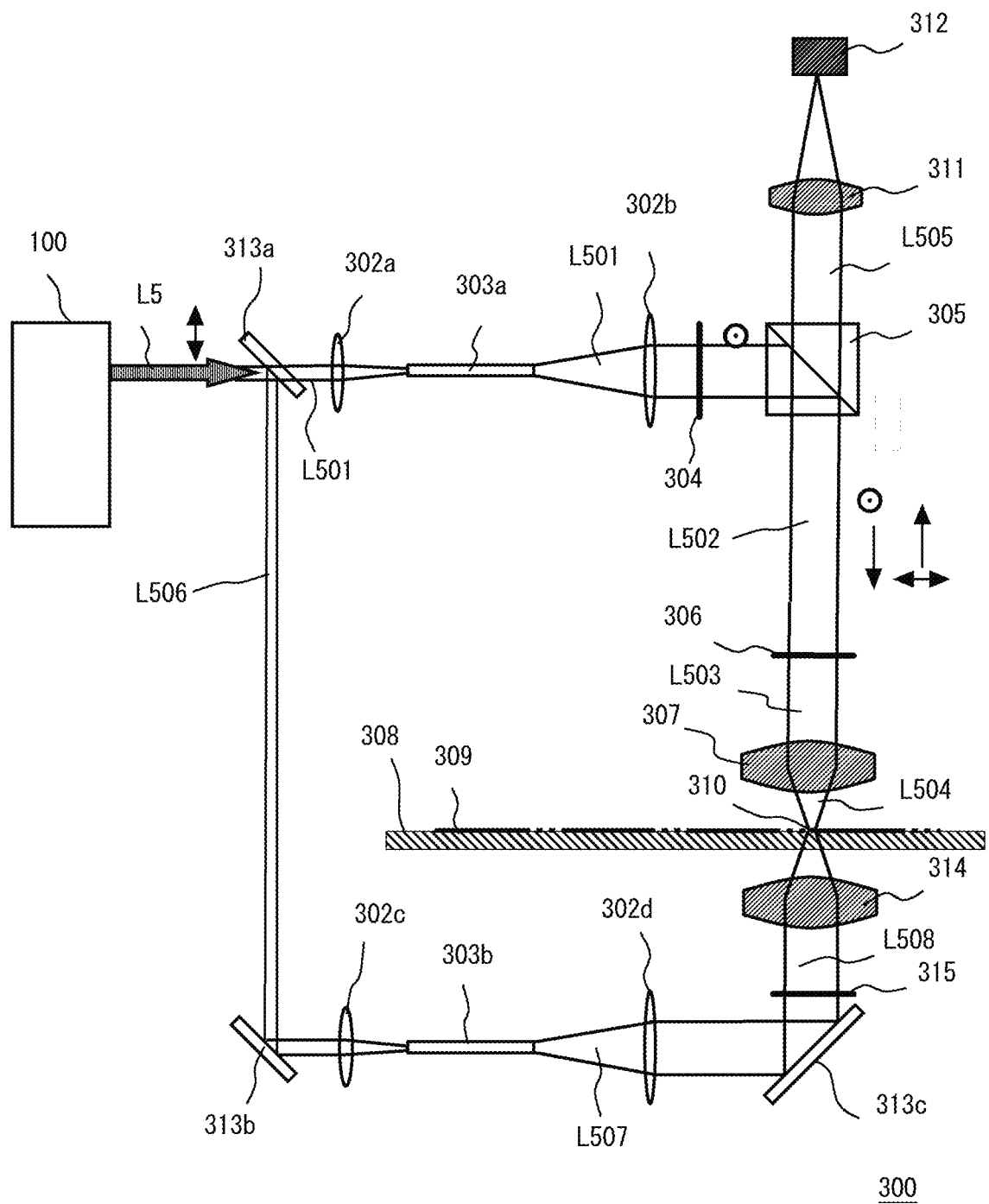
FIG. 18 is a configuration diagram showing a configuration of an inspection apparatus according to the first embodiment.

Next, a configuration of an inspection apparatus using the light-source apparatus 100 according to the first embodiment will be described with reference to FIG. 18. FIG. 18 shows an overall configuration of an inspection apparatus 300. The inspection apparatus 300 shown in FIG. 18 is an inspection apparatus for photomasks that are used in exposure processes in the manufacturing of semiconductor devices or the like. Note that a photomask to be inspected is typically used in lithography in which DUV light having a wavelength of 193 nm is used as the exposure wavelength. Needless to say, the objects to be inspected are not limited to photomasks.

As shown in FIG. 18, the inspection apparatus 300 includes the light-source apparatus 100, lenses 302a to 302d, uniformizing optical systems 303a and 303b, a λ/2 wave plate 304, a polarizing beam splitter 305, a λ/4 wave plate 306, an objective lens 307, an imaging lens 311, a two-dimensional photodetector 312, a half mirror 313a, mirrors 313b to 313c, a condenser lens 314, and a 3λ/4 wave plate 315.

The light-source apparatus 100 generates illumination light L5, which is a P-wave. The illumination light L5 corresponds to the deep UV light L4. Alternatively, wavelength-converted light that is generated by further making the deep UV light L4 incident on a wavelength conversion element may be used as the illumination light. The illumination light L5 is divided into two illumination light beams by the half mirror 313a. Note that a part of the illumination light L5 that has passed through the half mirror 313a becomes laser light L501 for reflective illumination, and a part of the illumination light L5 reflected by the half mirror 313a becomes laser light L506 for transmissive illumination.

The laser light L501 for reflective illumination is concentrated by the lens 302a and is incident on the uniformizing optical system 303a. For example, one called a rod-shaped integrator is suitable for the uniformizing optical system 303a.

The laser light L501 for reflective illumination of which the intensity distribution has been spatially uniformized (i.e., has been made spatially uniform) is emitted from the uniformizing optical system 303a. The laser light L501 for reflective illumination passes through the lens 302b, and then passes through the λ/2 wave plate 304, so that its polarization direction is rotated by 90°. As a result, the laser light L501 become an S-wave. Then, the laser light L501 for reflective illumination, which has become an S-wave, is incident on the polarizing beam splitter 305 and reflected downward as shown as laser light L502 for reflective illumination shown in FIG. 18. The Laser light L502 for reflective illumination passes through the λ/4 wave plate 306, and thereby becomes circularly-polarized laser light L503 for reflective illumination. The laser light L503 for reflective illumination passes through the objective lens 307 and illuminates an observation area 310 within a pattern surface 309 of a photomask 308. Note that the above-described illumination system is an illumination system called a reflective illumination system. Then, the reflected light, i.e., the light that has been reflected by the pattern surface 309 of the photomask 308 and travels upward becomes laser light L504.

Meanwhile, the laser light L506 for transmissive illumination supplied from the light-source apparatus 100 is reflected by the mirror 313b. The laser light L506 for transmissive illumination reflected by the mirror 313b is concentrated by the lens 302c and is incident on the uniformizing optical system 303b. As the laser light travels through the uniformizing optical system 303b, laser light L507 for transmissive illumination of which the intensity distribution has been spatially uniformed is emitted therefrom. The laser light L307 for transmissive illumination passes through the lens 302d, is reflected by the mirror 313c, passes through the ¾ wave plate 315, and becomes circularly-polarized laser light L508 for transmissive illumination. Then, the laser light L508 for transmissive illumination passes through the condenser lens 314 and irradiates (i.e., illuminate) the observation area 310 within the pattern surface 309 of the photomask 308. Note that the above-described illumination system is an illumination system called a transmissive illumination system. The light that has passed through the photomask 308 and travels upward becomes laser light L504.

The laser beam L304 reflected by the photomask 308 or the laser beam L504 that has passed through the photomask 308 passes through the objective lens 307 and then passes through the λ/4 wave plate 306, so that the laser beam returns to linearly-polarized laser light. The laser beam L504, which travels upward, becomes a P-wave of which the polarization direction is perpendicular to that of the laser light L502 for transmissive illumination, which travels downward, and passes through the polarizing beam splitter 305. As a result, the laser beam travels as shown as laser light L505, passes through the imaging lens 311, and hits the two-dimensional photodetector 312. Therefore, the two-dimensional photodetector 312 takes an image of the photomask 308 illuminated by the wavelength-converted light. The observation area 310 is magnified and projected onto the two-dimensional photodetector 312, and the magnified and projected pattern is inspected. Note that for the two-dimensional photodetector 312, an image-pickup device such as a CCD sensor, a CMOS sensor, or a TDI sensor can be used.

Embodiments according to the present disclosure have been described above. However, the present disclosure includes various modifications that do not impair the purposes and the advantages of the present disclosure, and is not limited by the above-described embodiments.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A light-source apparatus comprising:
a first light source configured to generate visible light in a wavelength range of 466 nm to 472 nm;
a first external resonator including a plurality of optical mirrors;
a BBO crystal disposed in the first external resonator, capable of generating UV (UltraViolet) light in a wavelength range of 233 nm to 236 nm, the UV light being a second harmonic of the visible light;
a one- or two-dimensional semiconductor sensor disposed near a far-field image plane formed through an optical element provided on an optical path of the UV light;
a calculation unit configured to calculate a representative position of a light intensity distribution detected by the semiconductor sensor;
a temperature control unit configured to adjust a temperature of the BBO crystal so that the representative position is confined within a predetermined range;
a second light source configured to generate IR (InfraRed) light in a wavelength range of 1,071 nm to 1,138 nm;
a second external resonator including a plurality of optical mirrors;
a CLBO crystal disposed in the second external resonator and capable of generating deep UV light having a wavelength of about 193 nm, the deep UV light being sum-frequency-mixed light of the UV light and the IR light;
a condensing lens configured to concentrate the UV light in the CLBO crystal; and
a beam splitter disposed between the condensing lens and the CLBO crystal, configured to take out UV light incident on the semiconductor sensor, wherein
an initial value of the representative position is set so that an output of the deep UV light is maximized.

2. The light-source apparatus according to claim 1, wherein
the temperature control unit determines a temperature correction amount of the BBO crystal based on a linear equation representing a relationship between the representative position and the temperature of the BBO crystal,
the semiconductor sensor is a CCD sensor,
the BBO crystal is spatially translated as optical damages occurs, and
the temperature control unit determines the temperature correction amount based on a difference between the initial value set before the BBO crystal is spatially translated and the representative position after the BBO crystal is spatially translated.

3. The light-source apparatus according to claim 1, wherein the representative position is a position of the center of gravity of the light intensity distribution.

4. An inspection apparatus wherein the deep UV light generated by the light-source apparatus according to claim 1 is used as irradiation light.

5. An adjustment method for adjusting a temperature of a BBO crystal disposed in a first external resonator including a plurality of optical mirrors, the BBO crystal being capable of generating UV light in a wavelength range of 233 nm to 236 nm, the UV light being a second harmonic of visible light in a wavelength range of 466 nm to 472 nm,
the adjustment method comprising:
calculating a representative position of a light intensity distribution detected by a one- or two-dimensional semiconductor sensor disposed near a far-field image plane formed through an optical element provided on an optical path of the UV light;
adjusting a temperature of the BBO crystal so that the representative position is confined within a predetermined range;
generating IR light in a wavelength range of 1,071 nm to 1,138 nm;
generating, by a CLBO crystal disposed in a second external resonator including a plurality of optical mirrors, deep UV light having a wavelength of about 193 nm, the deep UV light being sum-frequency-mixed light of the UV light and the IR light;
concentrating, by a condensing lens, the UV light in the CLBO crystal; and
taking out, by a beam splitter disposed between the condensing lens and the CLBO crystal, UV light incident on the semiconductor sensor, wherein an initial value of the representative position is set so that an output of the deep UV light is maximized.

* * * * *